United States Patent
Palais et al.

(10) Patent No.: US 9,595,080 B2
(45) Date of Patent: *Mar. 14, 2017

(54) IMPLEMENTING AND INTERPOLATING ROTATIONS FROM A COMPUTING INPUT DEVICE

(71) Applicant: The University of Utah Research Foundation, Salt Lake City, UT (US)

(72) Inventors: Robert Andrew Palais, Salt Lake City, UT (US); Richard Sheldon Palais, Irvine, CA (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,711

(22) Filed: Aug. 29, 2014

(65) Prior Publication Data

US 2014/0368546 A1    Dec. 18, 2014

Related U.S. Application Data

(63) Continuation of application No. 12/999,281, filed as application No. PCT/US2009/047965 on Jun. 19, 2009, now Pat. No. 8,860,764.

(60) Provisional application No. 61/073,861, filed on Jun. 19, 2008, provisional application No. 61/088,387, filed on Aug. 13, 2008.

(51) Int. Cl.
| | | |
|---|---|---|
| G09G 5/00 | (2006.01) | |
| G06T 3/60 | (2006.01) | |
| G06T 13/20 | (2011.01) | |
| G06T 19/20 | (2011.01) | |

(52) U.S. Cl.
CPC ............... G06T 3/60 (2013.01); G06T 13/20 (2013.01); G06T 19/20 (2013.01); *G06T 2210/32* (2013.01); *G06T 2219/2016* (2013.01)

(58) Field of Classification Search
CPC .............................. G06T 19/00; G06T 13/20
USPC .................................................. 345/655, 419
See application file for complete search history.

(56) References Cited

U.S. PATENT DOCUMENTS

| | | |
|---|---|---|
| 6,253,164 B1 | 6/2001 | Rohm et al. |
| 2003/0058242 A1 | 3/2003 | Redlich |
| 2005/0213082 A1 | 9/2005 | DiBernardo et al. |
| 2007/0043526 A1 | 2/2007 | De Jonge et al. |

(Continued)

FOREIGN PATENT DOCUMENTS

WO    PCT/US09/047965    1/2011

OTHER PUBLICATIONS

International Search Report for PCT/US2009/047965 dated Dec. 23, 2009.

(Continued)

*Primary Examiner* — Kyle Zhai
(74) *Attorney, Agent, or Firm* — Workman Nydegger

(57) ABSTRACT

Novel and simple methods, systems, and computer program products for implementing a 3D rotation using input from a mouse, trackball, or other input device are described. Methods of implementing rotations are presented which lead to new realizations of the 3D rotation group and its double-cover, the unit quaternions. New methods, systems, and computer program products are also presented for interpolating rotations of a 3D scene that is more efficient than previously-known quaternion-based methods. The new methods are also used to derive the quaternion composition formula from the geometry of 3D rotations.

18 Claims, 10 Drawing Sheets

(56) References Cited

U.S. PATENT DOCUMENTS

| | | |
|---|---|---|
| 2007/0242886 A1 | 10/2007 | St. John |
| 2008/0009734 A1 | 1/2008 | Houle et al. |
| 2008/0117208 A1 | 5/2008 | Chang et al. |
| 2011/0193883 A1 | 8/2011 | Palais et al. |
| 2011/0210971 A1 | 9/2011 | Palais et al. |

OTHER PUBLICATIONS

Dam, E. B., et al. "Quaternions, Interpolation and Animation," Department of Computer Science University of Copenhagen, Jul. 17, 1998.
U.S. Appl. No. 61/073,856, filed Jun. 19, 2008, Palais et al.
U.S. Appl. No. 61/073,861, filed Jun. 19, 2008, Palais et al.
U.S. Appl. No. 61/088,387, filed Aug. 13, 2008, Palais et al.
U.S. Appl. No. 61/095,453, filed Sep. 9, 2008, Palais et al.
U.S. Appl. No. 12/999,281, Jan. 3, 2014, Office Action.
U.S. Appl. No. 12/999,281, May 29, 2014, Notice of Allowance.
International Preliminary Report on Patentability from PCT/US2009/047965 dated Jan. 6, 2011.
International Search Report for PCT/US2009/047978 dated Jan. 22, 2010.
Palais et al., "New Algorithms for Implementing and Interpolating Rotations," Preliminary Version Jan. 21, 2008.
Palais et al., "A Stable Efficient Algorithm for Building a Rotation Matrix."

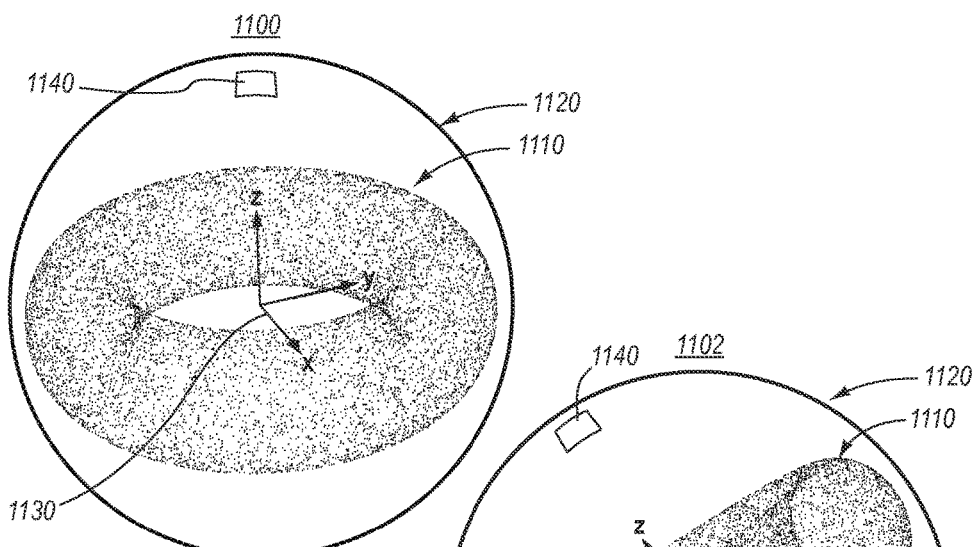
FIG. 11A
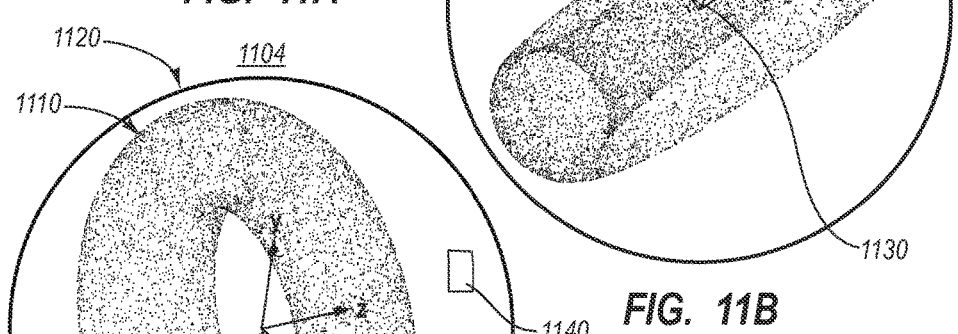
FIG. 11B
FIG. 11C
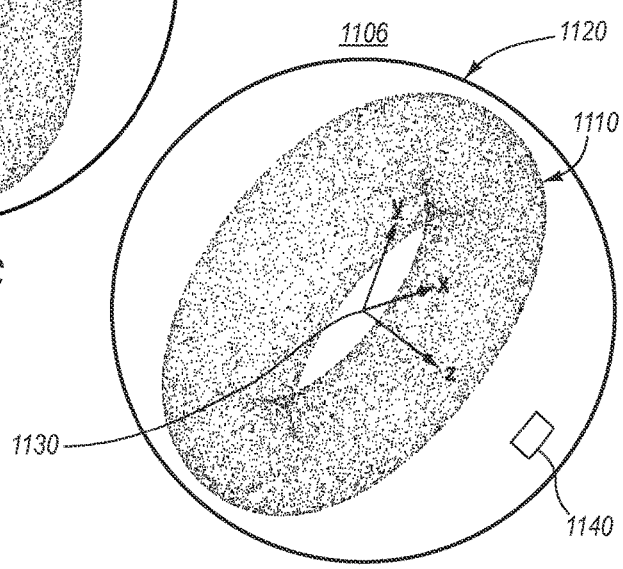
FIG. 11D

IMPLEMENTING AND INTERPOLATING ROTATIONS FROM A COMPUTING INPUT DEVICE

CROSS-REFERENCE TO RELATED APPLICATIONS

This Application is a continuation of and claims priority to U.S. patent application Ser. No. 12/999,281, entitled "IMPLEMENTING AND INTERPOLATING ROTATIONS FROM A COMPUTING INPUT DEVICE," filed on Mar. 18, 2011, which is incorporated herein by reference in its entirety. U.S. patent application Ser. No. 12/999,281, in turn, is the National Stage Entry of PCT/US09/47965, filed Jun. 19, 2009, and which claims priority to U.S. Provisional Patent Application Ser. No. 61/073,861, entitled "METHODS FOR IMPLEMENTING AND INTERPOLATING ROTATIONS FROM A COMPUTING INPUT DEVICE," filed on Jun. 19, 2008, which is incorporated herein by reference in its entirety and which Application also claims priority to U.S. Provisional Patent Application Ser. No. 61/088,387, entitled "METHODS FOR IMPLEMENTING AND INTERPOLATING ROTATIONS FROM A COMPUTING INPUT DEVICE," filed Aug. 13, 2008, which is incorporated herein by reference in its entirety.

BACKGROUND

Implementing and interpolating rotations of n-dimensional objects and virtual n-dimensional objects are important tools within computer graphics, animation, and robotics (and among other fields and applications).

There are many methods well-known in computer graphics for implementing a three-dimensional rotation $R \in SO(3)$ specified by two-dimensional user input from various controllers such as, for example, a joystick, a trackball, a touchpad, a pen tablet, or a mouse. Many of these algorithms are typically based on a dynamic mapping of the position of the controller to a unit vector in $\mathbb{R}^3$. Such a mapping converts the current position of the controller to a unit vector $u_0 \in \mathbb{R}^3$, and when that position is moved, the new position is converted to a second unit vector $u_1 \in \mathbb{R}^3$. For an object on the display device (e.g., a computer screen) to follow the mouse naturally, as if it were being dragged, one must perform a rotation $\rho$ on it satisfying $u_1 = \rho u_0$. However, there are infinitely many such rotations, since one could also perform any rotation about $u_0$, followed by $\rho$, followed by any rotation about $u_1$, and still have $u_0$ map to $u_1$. However, if $u_1 \neq -u_0$, there is a single unique rotation that takes $u_0$ to $u_1$ and that acts as the identity on the orthogonal complement of $V := \text{span}\{u_0, u_1\}$. It is this rotation that is conventionally specified by giving a unit vector and its image, and it is called the transvection taking $u_0$ to $u_1$, denoted $T_{(u_0, u_1)}$. Note that, by orthogonality, $T_{(u_0, u_1)}$ preserves V.

In the computer graphics literature, a number of different methods have been recommended for implementing $T_{(u_0, u_1)}$, including: construction of a rotation matrix, using axis-angle (e.g., Euler-Rodrigues) formulas, construction of a unit quaternion, Q, and then conjugating by Q or else converting Q to a matrix, and even using Euler angles. Similar needs for specifying, implementing, and composing rotations, and proposed solutions in terms of quaternions and matrices also arise in other fields, including robotics, photogrammetry, and rocket motion control.

Each of the techniques that are currently known and which have been applied have disadvantages, including (but not limited to) the amount and complexity of computational resources and computational time which may be necessary for performing the requisite calculations.

BRIEF SUMMARY

Embodiments of the present invention present a simpler approach than those previously known, applied, or employed, and the embodiments described herein have not heretofore been discussed within the computer graphics literature. Further, the application of particular embodiments of the present invention may result in several advantages over methods and techniques previously known and applied as will become apparent in the following description.

Let $s = u_0 + u_1$ and $$c = \frac{2}{s \cdot s}.$$

Then for any $v \in \mathbb{R}^n$, if we let $w = 2(v \cdot u_0)u_0 - v$, we find $T_{(u_0, u_1)} v = c(w \cdot s)s - w$. This requires for each v two dot products and scalar multiplications and essentially little or no overhead. While by contrast, if R is the matrix of $T_{(u_0, u_1)}$, then computing Rv not only involves three dot products for each v, but also has the extra overhead of first requiring that R be constructed from $u_0$ and $u_1$.

The advantage of the present methods and techniques is pronounced when rotating a single object or scene. In doing this, it is only necessary to perform the inverse rotation on the few vectors that define a perspective viewing frame, rather than (as previously done) having to rotate each of the many points defining the polygons of a graphical object itself, which causes the overhead of computing R to become significant. (Note that the inverse rotation is obtained just by reversing the roles of $u_0$ and $u_1$ above.)

Embodiments of the present invention include methods, systems, and computer program products. Methods may include steps or instructions which may be carried out upon suitable computing equipment. Systems may include computer processors, data input and output devices, and computer-readable storage. Computer program products may include computer-readable media upon which is encoded computer-executable instructions which, when executed upon suitable computing equipment, causes the computing equipment to perform the methods and techniques described herein.

Embodiments of the present invention includes methods, systems, and computer program products for interpolating rotations from a computing input device. For interpolating rotations from a computing input device, one or more data structures comprising two rotations, $A_1$ and $A_2$ are received. Each rotation is expressed as a composition of two reflections, each reflection having a common initial reflection for each of the rotations, such that $A_1 = R_1 R$ and $A_2 = R_2 R_1$ and each reflection $R_j$ being of the form $R_j = 2u_j u_j^T - I$. Two unit vectors, $u_0$ and $u_1$, are interpolated by $u_s$, $0 \leq s \leq 1$, using a standard spherical interpolation on a two-dimensional unit sphere in three-dimensions. Interpolated rotations may then be computed by the formula by $A_s = R_s R$.

Embodiments of the present invention also includes methods, systems, and computer program products for constructing a rotation matrix for rotating a unit vector $u_0$ to another unit vector $u_1$ and preserving a plane and axis defined by the unit vectors for rotating a computer animated object. For constructing a rotation matrix for rotating a unit vector $u_0$ to another unit vector $u_1$ and preserving a plane and axis defined by the unit vectors for rotating a computer animated object, a sum, s, of the unit vectors, $s=u_0+u_1$ is computed. It may then be determined whether the sum, s, is equal to zero. A rotation matrix based upon the unit vectors and the sum, s, may then be determined. A rotation matrix, A, may then be computed as a result of the formula $A=I-2ss^t/(s^ts)+2u_1u_o^t$.

Embodiments of the present invention also includes methods, systems, and computer program products for rotating vectors defining a perspective of a viewer of a computer graphics output device to implement rotation of a computer generated image by taking a unit vector $u_0$ to another unit vector $u_1$ and preserving the plane and axis defined by the unit vectors. For rotating vectors defining a perspective of a viewer of a computer graphics output device to implement rotation of a computer generated image by taking a unit vector $u_0$ to another unit vector $u_1$ and preserving the plane and axis defined by the unit vectors, data indicative of unit vectors $u_0$ and $u_1$ from a computer generated input device may be received. A rotation as seen from the viewpoint may be computed by performing an inverse rotation $A^{-1}$ on an orthogonal frame describing an orientation of a viewpoint. Performing the inverse rotation $A^{-1}$ on an orthogonal frame comprises constructing a sum s of the unit vectors, $s=u_0+u_1$; computing a normalization factor $k=2/s^Ts$; performing an inverse rotation for two of three vectors of a viewpoint frame, $e_0$ and $e_1$, by reflecting in s, then reflecting in $u_0$; and determining a third viewpoint orientation vector $e_2$ by computing a cross product of the two vectors that have been rotated.

To rotate an object relative to a viewpoint frame by the rotation taking $u_0$ to $u_1$, one may perform the inverse rotation taking $u_1$ to $u_0$ to the viewpoint frame. This may be accomplished by reflecting two of the viewpoint frame vectors, $e_0$ and $e_1$, first in s, then in $u_0$—rather than in the other order—then taking their cross product to obtain the third viewpoint frame vector. The reflections may be computed by applying the following formulas:

$$w_j=kss^Te_j-e_j, \text{ and } A^{-1}e_j=2u_0u_0^Tw_j-w_j.$$

A third viewpoint orientation vector $e_2$ may be determined by computing a cross product of the two vectors that have been rotated, such that $e_2=e_0 \times e_1$.

Embodiments of the present invention also includes methods, systems, and computer program products for calculating a spherical interpolation of two unit quaternions. For calculating a spherical interpolation of two unit quaternions, data is received comprising two unit quarternions, $Q_0$ and $Q_1$. It may be determined that $L((s+t)/2)=0.5(Q(s)+Q(t))$ does not result in a unit quaternion. $Q((s+t)/2)=L((s+t)/2)/\|L((s+t)/2)\|$ is normalized to obtain unit quaternions with to equally spaced $Q_t$ values. The normalization of $Q((s+t)/2)=L((s+t)/2)/\|L((s+t)/2)\|$ with $s=0$ and $t=1$ produces $Q(½)$. The normalization of $Q((s+t)/2)=L((s+t)/2)/\|L((s+t)/2)\|$ with $s=0$ and $t=½$ produces $Q(¼)$. And the normalization of $Q((s+t)/2)=L((s+t)/2)/\|L((s+t)/2)\|$ with $s=½$ and $t=1$ produces $Q(¾)$.

Embodiments of the present invention also includes methods, systems, and computer program products for mapping a point in an $e_1$-$e_2$ plane orthogonal to a vector $e_3$ to a point in the plane orthogonal to an arbitrary given unit vector u. For mapping a point in an $e_1$-$e_2$ plane orthogonal to a vector $e_3$ to a point in the plane orthogonal to an arbitrary given unit vector u, a data structure comprising a vector $v=c_1e_1+c_2e_2$ is accessed. The vector v is rotated by applying a rotation taking $e_3$ to u. Applying the rotation taking $e_3$ to u to the vector v comprises applying a reflection in $e_3$ to the vector v, resulting in a vector w; and applying a reflection in a sum, $e_3+u$, to the vector w.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 11A-11D illustrate a depiction of a torus which is rotated using embodiments of the present invention.

DETAILED DESCRIPTION

Figure 1:
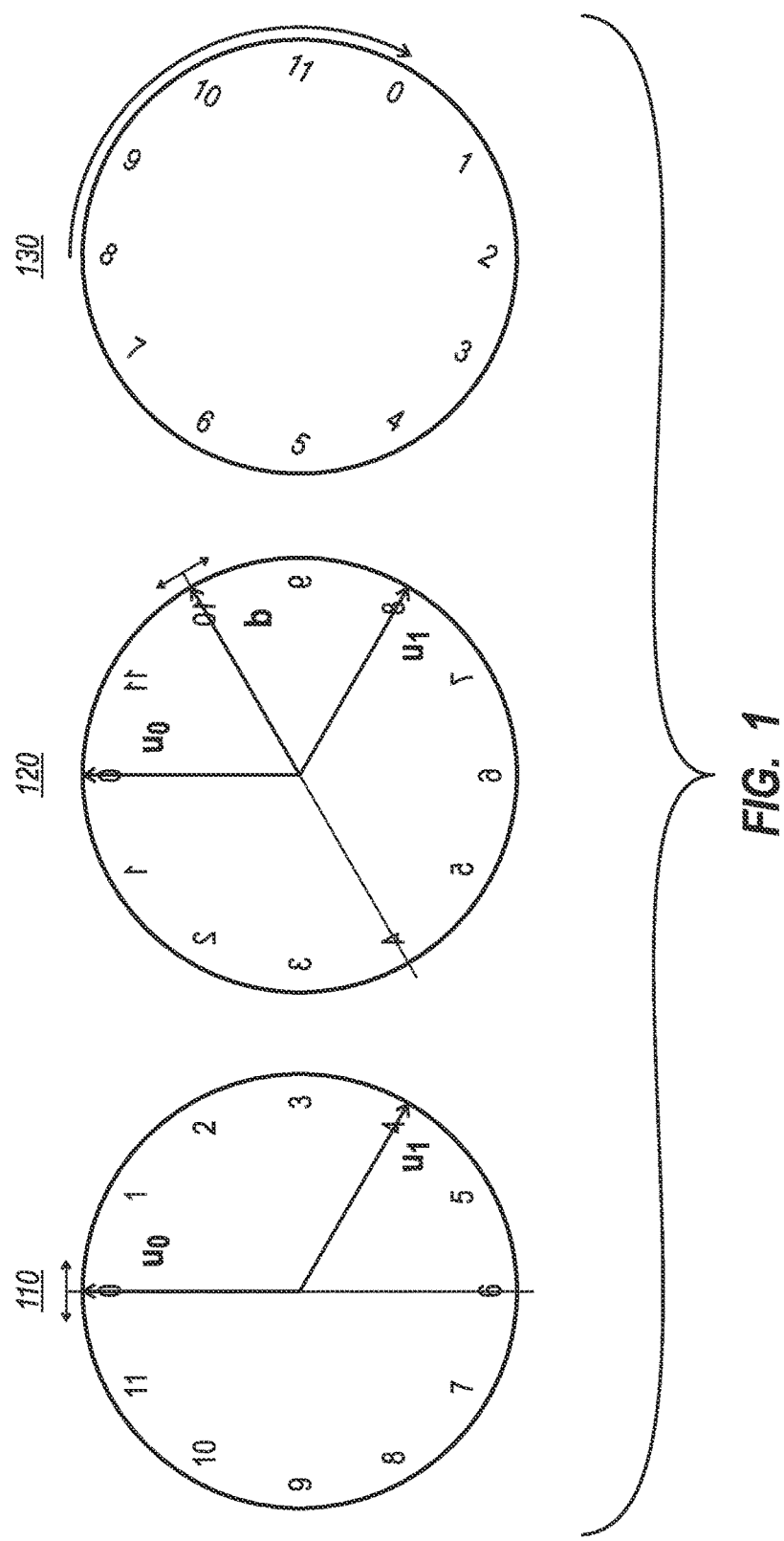
FIG. 1 illustrates the implementation of a rotation using a reflecting pair.

The present invention extends to methods, systems, and computer program products for implementing and interpolating rotations. Implementing and interpolating rotations is important to (but certainly not limited to) fields such as computer graphics where input from a mouse, for example, must be translated into 3-dimensional (or other dimensional) rotations for computer generated graphics. The embodiments of the present invention may comprise a special purpose or general-purpose computer including various computer hardware, as is well-known in the art and may be discussed in greater detail below.

Particular embodiments of the present invention present simpler, more efficient, more easily computed, and (in some instances) faster approaches than those previously known, applied, or employed. Further, embodiments described herein have not heretofore been discussed within the computer graphics literature. Further, the application of particular embodiments of the present invention may result in several advantages over methods and techniques previously known and applied as will become apparent in the following detailed description.

An example of a standard torus which has been rotated using an embodiment of the present invention is depicted in FIGS. 11A-11D. FIG. 11A depicts a two dimensional picture 1100 of a standard torus 1110 which may then be rotated using an embodiment of the present invention (as depicted in FIGS. 11B-11D).

FIG. 11A depicts a standard torus as if it were embedded within a virtual 3-dimensional trackball. The horizon 1120 of the virtual trackball is depicted by the solid circle. A 'finger patch' 1140 is depicted. The 'finger patch' 1140 is the virtual spot on the trackball that a user has 'grabbed' the trackball—as if placing a finger upon it—to rotate the trackball. An x-y-z axis 1130 is provided for reference to indicate the position of both the torus 1110 and the virtual trackball. In FIG. 11A, the North pole of both the torus 1110 and virtual trackball (e.g., z-axis) is pointing up.

FIG. 11B depicts a representation 1102 in which the trackball has been rotated approximately 45 degrees to the left and the x-y plane has been rotated approximately 45 degrees. As can be seen, the point cloud representing the torus now overlap for certain regions. In this representation 1102, the x-y-z axis 1130 is in the center of the torus 1110 but is partially obscured by the front-most 'dots' of the point cloud representing the torus 1110.

FIG. 11C depicts a representation 1104 of the torus 1110 and trackball in which the z-axis has now been rotated approximately 75 degrees to the right (from the original "North" position) and the x-y plane has been rotated approximately 45 degrees. The 'finger patch' 1140 depicts where a users virtual finger (through input from an input device such as a trackball or mouse) would now be positioned on the virtual trackball indicated partially by the horizon 1120. Note that the orientation of the virtual trackball is calculated using embodiments of the present invention and data from a computer input device (e.g., mouse).

Finally, FIG. 11D depicts a representation 1106 of the torus 1110 and trackball in which the z-axis has now been rotated into a somewhat down and right direction as indicated by the x-y-z axis 1130 and the 'finger patch' 1140 on the virtual trackball.

Notably, each representation 1100-1106 of the torus 1110 embedded within the virtual 3-dimensional trackball and depicted in various viewing angles was rotated by actual implementations of particular embodiments of the present invention. Each position of the virtual trackball and the torus 1110 as depicted in FIGS. 11A-11D, used input from a computer input device (e.g., mouse or trackball), and was calculated using an actual implementation of a particular embodiment of the present invention. The results were rendered on a computer display device (e.g., computer monitor). The positions and orientations of the virtual 3-dimensional trackball, as depicted in FIGS. 11A-11D and by finger patch 1140, horizon 1120, and z-y-z-axis 1130, were also calculated by actual embodiments of the present invention.

It may also be noted that the 'dots' (i.e., the point cloud) used to render the torus 1110 within the virtual trackball in FIGS. 11A-11D were generated using technology which is described in co-pending patent application "GENERATING POINT CLOUDS," application Ser. No. 12/999,268, filed Jun. 19, 2009.

Details of particular embodiments of the present invention as employed above to generate FIGS. 11A-11D are described herein.

Let $s=u_0+u_1$ and $$c = \frac{2}{s \cdot s}.$$

Then for any $v \in \mathbb{R}^n$, if we let $w=2(v \cdot u_0)u_0-v$, we find $T_{(u_0, u_1)}v=c(w \cdot s)s-w$. This requires for each v two dot products and scalar multiplications and essentially little or no overhead. While by contrast, if R is the matrix of $T_{(u_0, u_1)}$, then computing Rv not only involves three dot products for each v, but also has the extra overhead of first requiring that R be constructed from $u_0$ and $u_1$.

The advantage of the present methods and techniques is pronounced when rotating a single object or scene. In doing this, it is only necessary to perform the inverse rotation on the few vectors that define a perspective viewing frame, rather than (as previously done) having to rotate each of the many points defining the polygons of a graphical object itself, which causes the overhead of computing R to become significant. (Note that the inverse rotation is obtained just by reversing the roles of $u_0$ and $u_1$ above.)

Embodiments of the present invention include methods, systems, and computer program products. Methods may include steps or instructions which may be carried out upon suitable computing equipment. Systems may include computer processors, data input and output devices, and computer-readable storage. Computer program products may include computer-readable media upon which is encoded computer-executable instructions which, when executed upon suitable computing equipment, causes the computing equipment to perform the methods and techniques described herein.

Embodiments of the present invention includes methods, systems, and computer program products for interpolating rotations from a computing input device. For interpolating rotations from a computing input device, one or more data structures comprising two rotations, $A_1$ and $A_2$ are received. Each rotation is expressed as a composition of two reflections, each reflection having a common initial reflection for each of the rotations, such that $A_1=R_1R$ and $A_2=R_2R_1$ and each reflection $R_j$ being of the form $R_j=2u_ju_j^T-I$. Two unit vectors, $u_0$ and $u_1$, are interpolated by $u_s$, $0<s<1$, using a standard spherical interpolation on a two-dimensional unit sphere in three-dimensions. Interpolated rotations may then be computed by the formula by $A_s=R_sR$.

Embodiments of the present invention also includes methods, systems, and computer program products for constructing a rotation matrix for rotating a unit vector $u_0$ to another unit vector $u_1$ and preserving a plane and axis defined by the unit vectors for rotating a computer animated object. For constructing a rotation matrix for rotating a unit vector $u_0$ to another unit vector $u_1$ and preserving a plane and axis defined by the unit vectors for rotating a computer animated object, a sum, s, of the unit vectors, $s=u_0+u_1$ is computed. It may then be determined whether the sum, s, is equal to zero. A rotation matrix based upon the unit vectors and the sum, s, may then be determined. The rotation matrix, A, may be determined as a result of the formula $A=I-2ss^T/(s^Ts)+2u_1u_o^T$.

Embodiments of the present invention also includes methods, systems, and computer program products for rotating vectors defining a perspective of a viewer of a computer graphics output device to implement rotation of a computer generated image by taking a unit vector $u_0$ to another unit vector $u_1$ and preserving the plane and axis defined by the unit vectors. For rotating vectors defining a perspective of a viewer of a computer graphics output device to implement rotation of a computer generated image by taking a unit vector $u_0$ to another unit vector $u_1$ and preserving the plane and axis defined by the unit vectors, data indicative of unit vectors $u_0$ and $u_1$ from a computer generated input device may be received. A rotation as seen from the viewpoint may be computed by performing an inverse rotation $A^{-1}$ on an orthogonal frame describing an orientation of a viewpoint. Performing the inverse rotation $A^{-1}$ on an orthogonal frame comprises constructing a sum s of the unit vectors, $s=u_0+u_1$; computing a normalization factor $k=2/s^Ts$; performing an inverse rotation for two of three vectors of a viewpoint frame, $e_0$ and $e_1$, by reflecting in s, then reflecting in computing $u_0$; and determining a third viewpoint orientation vector $e_2$ by computing a cross product of the two vectors that have been rotated.

To rotate an object relative to a viewpoint frame by the rotation taking $u_0$ to $u_1$, one may perform the inverse rotation taking $u_1$ to $u_0$ to the viewpoint frame. This may be accomplished by reflecting two of the viewpoint frame vectors, $e_0$ and $e_1$, first in s, then in $u_0$—rather than in the other order—then taking their cross product to obtain the third viewpoint frame vector. The reflections may be computed by applying the following formulas:

$$w_j = kss^T e_j - e_j, \text{ and } A^{-1}e_j = 2u_0 u_0^T w_j - w_j.$$

A third viewpoint orientation vector $e_2$ may be determined by computing a cross product of the two vectors that have been rotated, such that $e_2 = e_0 \times e_1$.

Embodiments of the present invention also includes methods, systems, and computer program products for calculating a spherical interpolation of two unit quaternions. For calculating a spherical interpolation of two unit quaternions, data is received comprising two unit quarternions, $Q_0$ and $Q_1$. It may be determined that $L((s+t)/2)=0.5(Q(s)+Q(t))$ does not result in a unit quaternion. $Q((s+t)/2)=L((s+t)/2)/\|L((s+t)/2)\|$ is normalized to obtain unit quaternions with equally spaced $Q_r$ values. The normalization of $Q((s+t)/2)=L((s+t)/2)/\|L((s+t)/2)\|$ with $s=0$ and $t=1$ produces $Q(\frac{1}{2})$. The normalization of $Q((s+t)/2)=L((s+t)/2)/\|L((s+t)/2)\|$ with $s=0$ and $t=\frac{1}{2}$ produces $Q(\frac{1}{4})$, and the normalization of $Q((s+t)/2)=L((s+t)/2)/\|L((s+t)/2)\|$ with $s=\frac{1}{2}$ and $t=1$ produces $Q(\frac{3}{4})$. Or, one can continue in this fashion to define $Q(r)$ recursively for all dyadic rational r with $0<r<1$.

Embodiments of the present invention also includes methods, systems, and computer program products for mapping a point in an $e_1$-$e_2$ plane orthogonal to a vector $e_3$ to a point in the plane orthogonal to an arbitrary given unit vector u. To do this, a data structure comprising a vector $v=c_1 e_1 + c_2 e_2$ is accessed. The vector v is rotated by applying a rotation taking $e_3$ to u. Applying the rotation taking $e_3$ to u to the vector v comprises applying a reflection in $e_3$ to the vector v, resulting in a vector w; and applying a reflection in a sum, $e_3+u$, to the vector w.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the communications connection as a computer-readable medium. Thus, any such connection is properly termed a computer-readable medium. Accordingly, combinations of the above should also be included within the scope of computer-readable media such that computer-readable media may include (physical) storage media as well as communications media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described. Rather, the specific features and acts described are disclosed as example forms of implementing the claims.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

For descriptive purposes, the architecture described is only one example of a suitable environment and is not intended to suggest any limitation as to the scope of use or functionality of the invention. Neither should the computing systems be interpreted as having any dependency or requirement relating to any one or combination of components described.

The invention is operational with numerous other general-purpose or special-purpose computing or communications environments or configurations. Examples of well known computing systems, environments, and configurations suitable for use with the invention include, but are not limited to, computer graphics systems, mobile telephones, pocket computers, personal computers, servers, multiprocessor systems, microprocessor-based systems, minicomputers, mainframe computers, and distributed computing environments that include any of the above systems or devices.

In its most basic configuration, a computing system typically includes at least one processing unit and memory. The memory may be volatile (such as RAM), non-volatile (such as ROM, flash memory, etc.), or some combination of the two.

The storage media devices may have additional features and functionality. For example, they may include additional storage (removable and non-removable) including, but not limited to, PCMCIA cards, magnetic and optical disks, and magnetic tape. Such additional storage may include removable storage and non-removable storage. Computer-storage media include volatile and non-volatile, removable and non-removable media implemented in any method or technology for storage of information such as computer-readable instructions, data structures, program modules, or other data. Memory, removable storage, and non-removable storage are all examples of computer-storage media. Computer storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system may also contain communication channels that allow a host to communicate with other systems and devices over a network. Communication channels are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

The computing system may also have input components such as a keyboard, mouse, pen, a voice-input component, a touch-input device, and so forth as are known in the art. Output components include screen displays, speakers, printers, etc., and rendering modules (sometimes called "drivers") for driving them. The computing system has a power supply. All these components are well known in the art and need not be discussed at length here.

1. Implementing Prescribed Rotations by Reflecting Pairs

Embodiments of the present invention present a simpler approach for rotating vectors which has heretofore not been discussed elsewhere in the computer graphics literature and which has numerous advantages.

Let $s = u_0 + u_1$ and $$c = \frac{2}{s \cdot s}.$$

Then for any $v \in \mathbb{R}^n$, if one let $w = 2(v \cdot u_0)u_0 - v$, we find $T_{(u_0, u_1)}v = c(w \cdot s)s - w$. This requires for each $v$ two dot products and scalar multiplications and essentially no overhead. While by contrast, however, if R is the matrix of $T_{(u_0, u_1)}$, then computing Rv not only involves three dot products for each v, but also has the extra overhead of first requiring that one construct R from $u_0$ and $u_1$. The advantage of embodiments of the present invention is particularly pronounced when rotating a single object or scene. For this (see the appendix for details), one only needs to perform an inverse rotation on a few vectors that define a perspective viewing frame, rather than having to rotate each of the many points defining the polygons of the object itself, which causes the overhead of computing R to become significant. (Note that the inverse rotation is obtained just by reversing the roles of $u_0$ and $u_1$ above.)

To understand embodiments of the present invention better, one may consider the more familiar representation of a rotation as the composition of reflection in two planes. The two steps above are reflections in lines, a less familiar concept. In general, reflection in a subspace is the linear operator that acts as the identity on that subspace and minus the identity on its orthogonal complement. By Pythagoras, any reflection is distance preserving, and either orientation reversing or preserving depending on whether the orthogonal complement is odd or even dimensional. But in either case, the composition of two reflections is distance and orientation preserving, i.e., it is a rotation. Note that any reflection $\rho$ is its own inverse, and is therefore symmetric, since it is also orthogonal, i.e., $\rho^T \rho = I$.

If U is the subspace spanned by a unit vector $u \in \mathbb{R}^3$, the operator $\rho_U$ performing reflection in U is given explicitly by the formula $\rho_U = \rho_u = 2P_u - I$, where $P_u$ is the orthogonal projection on U (or u), $P_u v = (v \cdot u)u$ and so $\rho_u v = 2(v \cdot u)u - v$. We check that if $v = u$, $\rho_u v = 2(u \cdot u)u - u = u$, so v is fixed, and if v is orthogonal to u, $\rho_u v = 2(v \cdot u)u - v = -v$, so v is reversed, which verifies the defining properties of the reflection in U.

The method presented above is equivalent to $T_{(u_0, u_1)} = \rho_b \rho_{u_0}$ where $$b = \frac{s}{\|s\|}$$

is the unit bisector of $u_0$ and $u_1$, since the factor c implicitly normalizes $s = u_0 + u_1$, without taking a square root. To see this one may use the fact that $d = u_0 - u_1$ is orthogonal to s, and that $u_0 = \frac{1}{2}(s+d)$, $u_1 = \frac{1}{2}(s-d)$, and the properties of reflections, which confirms that $\rho_b \rho_{u_0} u_0 = \rho_b u_0 = u_1$ (see FIG. 1). Also, since $\rho_{u_0}$ reverses the orthogonal complement of $u_0$, and $\rho_b$ reverses the orthogonal complement of b, their composition acts as the identity on the intersection of their complements, which is the same as the orthogonal complement of the span of $u_0$ and b, or $u_1$.

One may call an ordered pair of unit vectors whose reflection operators implement a transvection a reflecting pair for that transvection. One may make the preliminary observation that ($u_0$, b) and (b, $u_1$) are both reflecting pairs for $T_{(u_0, u_1)}$, since by arguments parallel to those above, $\rho_{u_1}\rho_b u_0 = \rho_{u_1} u_1 = u_1$, and $\rho_{u_1}\rho_b$ acts as the identity on the orthogonal complement of the span of $u_0$ and $u_1$.

Perhaps more geometrically, one can interpret this method in terms of its restriction to a sphere, and a globe of the Earth in particular. In this setting, reflection in an axis through some city N, ('reflection in N') corresponds to swapping all pairs of cities that are equidistant from N on any great circle through N. Then if one imagines N=New York to be the midpoint of B=Boston and W=Washington, D.C., one may accomplish the rotation of the globe taking B to W and preserving the great circle joining them by reflecting in B, then reflecting in N. The reason is that the first reflection fixes B, the second swaps B and W since they are equidistant from N, and both reflections preserve all distances and reverse all great circles through B and W, respectively. Therefore, their composition preserves the great circle containing both, and preserves its orientation, i.e., this is the transvection taking B to W. Again, one could also reflect first in N then in W with the same result, or in any pair of cities on the same great circle whose oriented distance apart is the same. In the next section there will be an explanation of the question of the complete set of reflecting pairs corresponding to a particular transvection, and its consequences.

This method could certainly also be specified in terms of commonly used Householder reflections in planes, $I - 2uu^T = -\rho_u$, since the two minus signs cancel. But perhaps the fact that the normal to the fixed plane, u, is reversed instead of fixed is why this approach has been ignored up to this point. It may also be that ever since Euler's Theorem on the axis of a three-dimensional rotation, as is known in the art, the axis-angle description of a rotation has supplanted all others. Here it may be observed that not only is it possible to omit the axis entirely from the computation, but also that it seems as physically natural to specify a rotation of a ball by pulling it along an equator as it would be to twirl it about some axis.

Another advantage, beyond simplicity, is that nothing in the above description depended upon the dimension of $\mathbb{R}^3$. The same construction and methodology would be valid in any $\mathbb{R}^n$. Indeed, the concept of transvection and the inspiration for the method comes from Elie Cartan's beautiful theory of symmetric spaces, and much of the above generalizes to that much broader context.

In the next section will be described other consequences of this approach, including a method for interpolating rotations, and a simple geometric realization of quaternions and derivation of their composition law.

Figure 2:
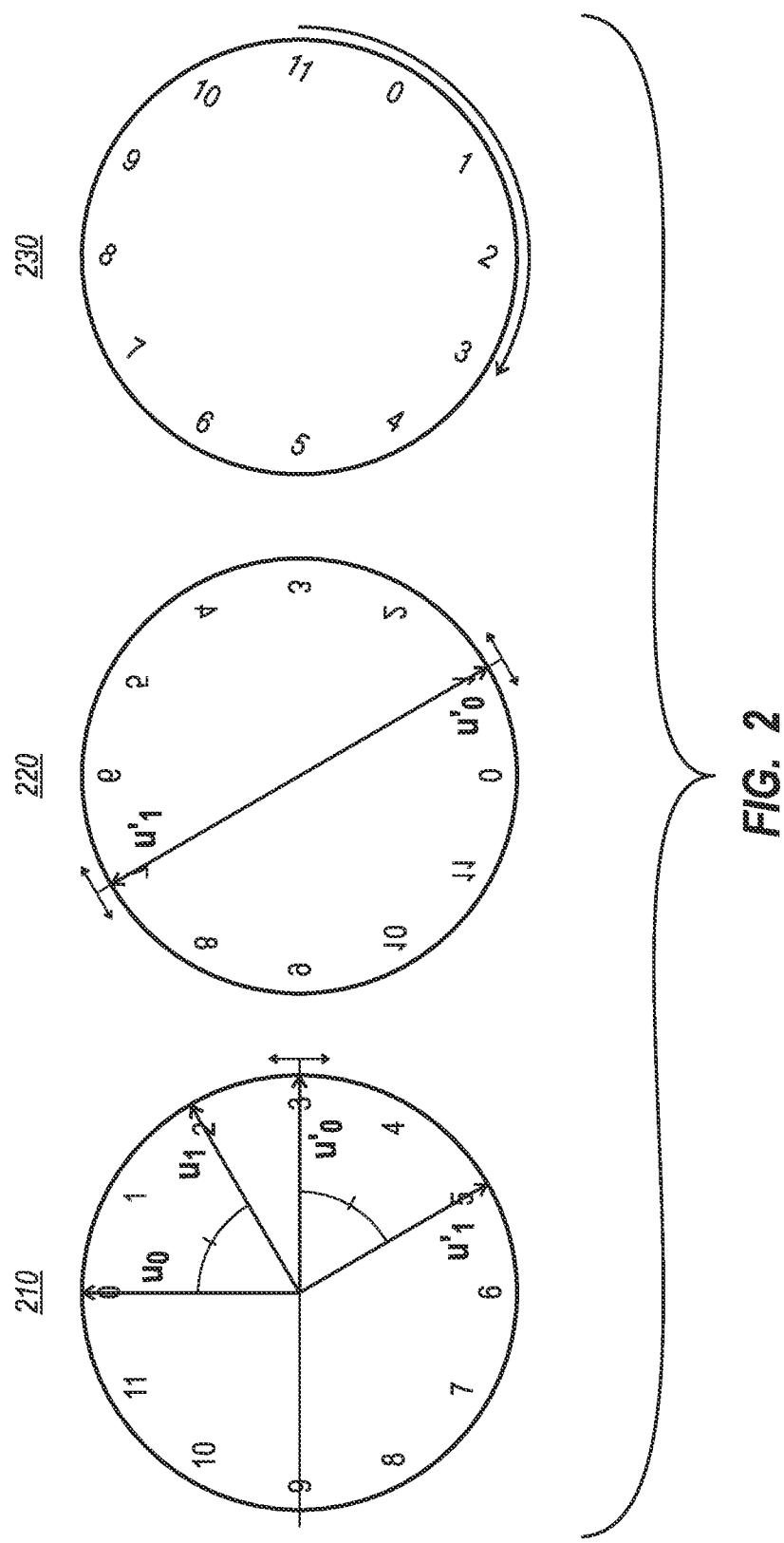
FIG. 2 illustrates implementing a rotation using another reflecting pair.

2. Using Equivalent Reflecting Pairs for Composing and Interpolating Rotations As has been noted above, $\rho_b \rho_{u_0}$ and $\rho_{u_1} \rho_b$ are equal to the unique rotation $T_{(u_0, u_1)}$ that takes $u_0$ to $u_1$ and acts as the identity on the orthogonal complement of the span of $u_0$ and $u_1$. It is natural to expect if there are two such reflecting pairs, then there are more, and to ask what are all reflecting pairs correspond to the same rotation. Geometrically, it is intuitively clear that if $u'_0$ and $u'_1$ are any two unit vectors spanning the same two-dimensional subspace as $u_0$ and $u_1$, and the oriented angle between $u'_0$ and $u'_1$, and between $u_0$ and $u_1$ are the same, then $\rho_{u_1}\rho_{u_0} = \rho_{u'_1}\rho_{u'_0}$. This is illustrated in FIG. 2 which, through 210, 220, and 230, illustrates implementing a rotation using an equivalent reflecting pair.

(Note that $u_1$ no longer plays the role of the image of $u_0$, but is an arbitrary unit vector in $\mathbb{R}^3$.) To prove this rigorously, one can use the conjugate relation between a rotation R and a reflection $\rho$: $\rho_{Ru} v = R \rho_u R^{-1} v$. Algebraically, if one defines the map Q from reflecting pairs to $\mathbb{R}^1 \times \mathbb{R}^3$ by $$Q:(u_0, u_1) \to Q(u_0, u_1) = [q, \mathbf{q}] = [u_0 \cdot u_1, u_0 \times u_1];$$

this condition is equivalent to $Q(u_0, u_1) = Q(u'_0, u'_1)$. We call q the scalar part of Q and $\mathbf{q}$ the vector part. It is an elementary vector identity that for any vectors $u_0$, $u_1$ in $\mathbb{R}^3$, $(u_0 \cdot u_1)^2 + \|u_0 \times u_1\|^2 = \|u_0\|^2 \|u_1\|^2$, so we see that if one identifies $\mathbb{R}^1 \times \mathbb{R}^3$ with $\mathbb{R}^4$, Q maps reflecting pairs of unit vectors to the unit sphere, $S^3 \subseteq \mathbb{R}^4$.

One may also note that reflecting in u is the same as reflecting in $-u$. Therefore, if one reverses either $u_0$ or $u_1$, there would be no affect on the resulting rotation, although both the scalar and vector parts of the resulting Q would be reversed. If one reverses both $u_0$ and $u_1$, one has just performed a half-turn rotation in the $u_0$-$u_1$ plane, and geometry and algebra both dictate that the scalar and vector parts of the resulting Q are unchanged. Symbolically, one can write this as $$Q(-u_0, u_1) = Q(u_0, -u_1) = -Q(u_0, u_1) = -Q(-u_0, -u_1),$$

where negation is meant component-wise in $\mathbb{R}^1 \times \mathbb{R}^3 \equiv \mathbb{R}^4$, and for the rotations, $$T_{(-u_0, u_1)} = T_{(u_0, -u_1)} = T_{(u_0, u_1)} = T_{(-u_0, -u_1)}.$$

It may also be shown that no other reflecting pairs correspond to the same rotation. In other words, $T_{(u_0, u_1)} = T_{(u'_0, u'_1)}$ if and only if $Q(u_0, u_1) = Q(u'_0, u'_1)$ or $Q(u_0, u_1) = -Q(u'_0, u'_1)$. (Note that this includes the special cases when $u_0 = \pm u_1$, for which $T_{(u_0, u_1)} = I$, the identity rotation, and $Q(u_0, u_1) = \pm[1, <0,0,0>]$.)

With the foregoing information, details of other embodiments of the invention may be described. The equivalence classes of reflecting pairs under the equivalence relation $(u_0, u_1) = u'_0, u'_1$) if and only if $Q(u_0, u_1) = Q(u'_0, u'_1)$ is isomorphic to and gives a useful geometric realization of the unit quaternion group, SU(2). (Information pertinent to this may be found in modern introductions, available in the literature, to the relationships between the Lie groups SO(3) and SU(2), Cayley-Klein parameters, Pauli matrices and spinors.) The equivalence classes of reflecting pairs under the equivalence relation $(u_0, u_1) = (u'_0, u'_1)$ if and only if $Q(u_0, u_1) = \pm Q(u'_0, u'_1)$ is isomorphic to and gives a useful geometric realization of the three-dimensional rotation group, SO(3).

The key to this fact is that just as one can define a composition law for equivalence classes of ordered pairs of points in Euclidean space (i.e., the parallelogram law) to realize geometrically composition of translations of $\mathbb{R}^n$, and just as one can define a composition for equivalence classes of ordered pairs of unit vectors in the plane (i.e., angle addition) to realize geometrically the composition law for the plane rotation group, SO(2)=U(1), in a completely analogous way one can compose equivalence classes of ordered pairs of reflections to help understand the composition of unit quaternions and rotations in SO(3).

If one is given any two ordered pairs of unit vectors, then since any two planes through the origin in $\mathbb{R}^3$ have a non-empty intersection, one can always find two equivalent pairs with the first unit vector of the second pair, u, equal to the second unit vector of the first pair.

Figure 3:
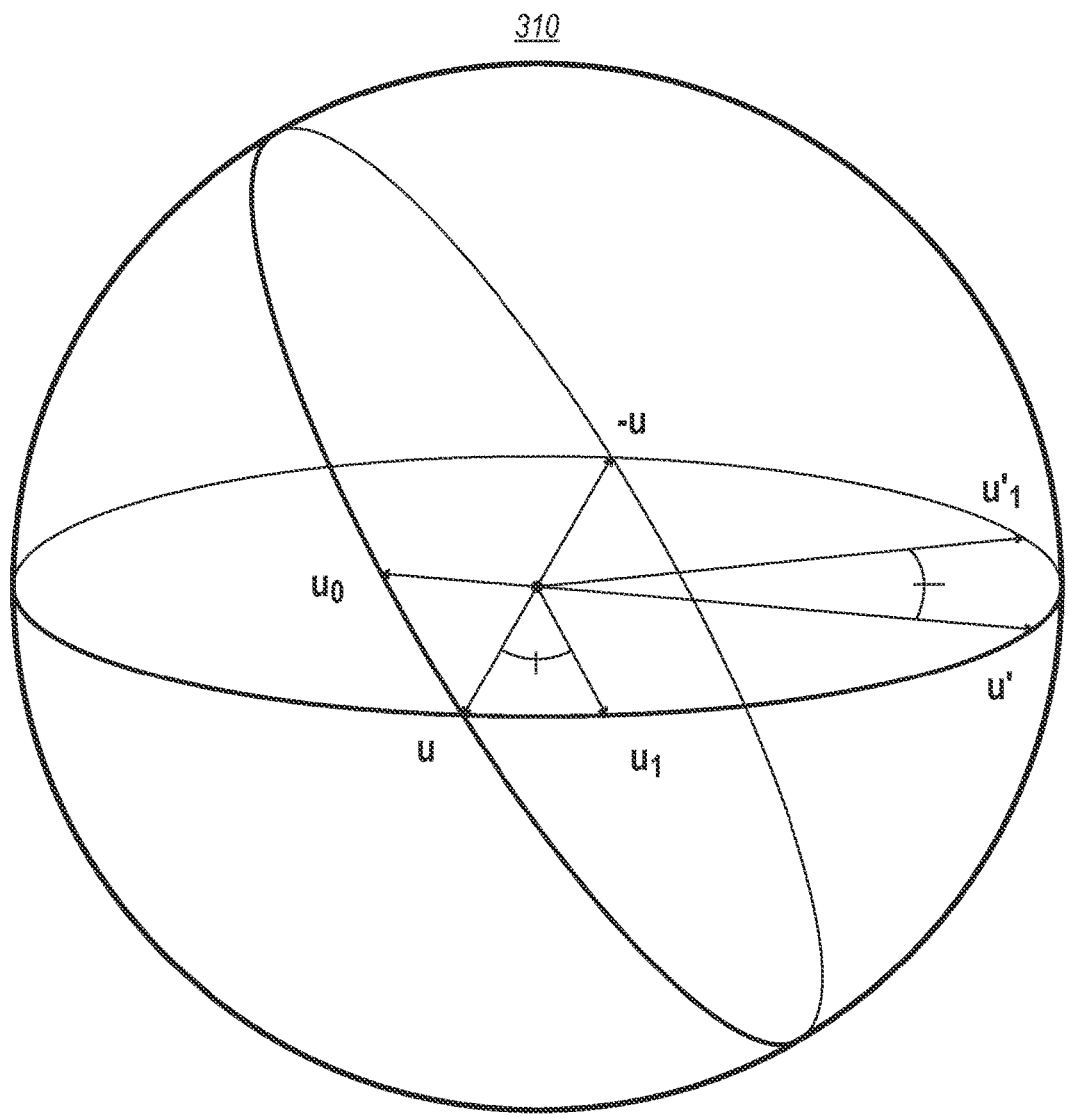
FIG. 3 illustrates the composition of reflecting pairs.

In FIG. 3, depicting the composition 310 of reflecting pairs, the original second pair (u', u'$_1$) is equivalent to (u, u$_1$), and the original first pair, (u'$_0$, u"), not shown, is equivalent to (u$_0$, u). Since the composition of the original rotations, $\rho_{u'_1}\rho_{u''}\rho_{u''}\rho_{u'_0}$ is equivalent to $\rho_{u_1}\rho_u\rho_u\rho_{u_0}$ and because the composition of any reflection with itself is the identity, $\rho_u^2 = I$, the composition of the original rotations is equivalent to $\rho_{u_1}\rho_{u_0}$. That is, the corresponding rotation is just the composition of reflection in the first vector of the first pair followed by reflection in the second vector of the second pair.

One may think of this as 'vector addition' or 'angle addition' for three-dimensional rotations, as long as one is careful to remember that the ordered pairs of vectors give the invariant subspace and half-angle of the rotation, rather than being in an 'initial-final' relation as in other settings. Given the invariant plane and half-angle of two rotations, this gives a coordinate-free description of the invariant plane and half-angle of their composition that one can perform with fingers just as one would with displacements or plane rotations. The construction is in some sense dual to the Euler-Schwarz spherical triangle construction.

From an algebraic perspective, this construction shows that equivalence classes of reflecting pairs are closed under composition, that the class (u, u) for any unit vector u is its identity, and the class of (u$_0$, u$_1$) is the inverse of the class of (u$_1$, u$_0$), in other words, they form a mathematical group.

It may be natural and appealing to take the geometric composition methods which have been described as the starting point to defining a translation group and plane rotation groups, and derive from them the corresponding algebraic rule for composing equivalence class invariants. For translations, one may find from congruent triangles that one adds the invariants, the displacements in each coordinate, component-wise.

The invariants for plane rotations described as equivalence classes of pairs of unit vectors in the plane are formally similar to those which may be used for unit quaternions:

$(u_0, u_1) = (u'_0, u'_1)$ if and only if $Q(u_0, u_1) = Q(u'_0, u'_1)$, as long as these vectors are interpreted as unit vectors in $\mathbb{R}^2$ by identifying the vector part with its non-vanishing component. Then Q may be reduced to a map taking $(u_0, u_1)$ to $\langle \cos\theta, \sin\theta \rangle$, where $\theta$ is the oriented angle between u$_0$ and u$_1$.

Using congruent and similar triangles, one can derive the composition law for the invariants of plane rotation from the geometry. If the invariants of the plane rotation taking u$_0$ to u are $\langle u_0 \cdot u, u_0 \times u \rangle = \langle \cos\theta_1, \sin\theta_1 \rangle$ and the invariants of the rotation taking u to u$_1$ are $\langle u \cdot u_1, u \times u_1 \rangle = \langle \cos\theta_2, \sin\theta_2 \rangle$, then the invariants of the plane rotation taking u$_0$ to u$_1$ are $\langle \cos\theta_1 \cos\theta_2 - \sin\theta_1 \sin\theta_2, \cos\theta_1 \sin\theta_2 + \cos\theta_2 \sin\theta_1 \rangle$, i.e., $u_0 \cdot u_1 = (u_0 \cdot u)(u \cdot u_1) - (u_0 \times u) \cdot (u \times u_1)$, and $u_0 \times u_1 = (u_0 \cdot u)(u \times u_1) + (u \cdot u_1)(u_0 \times u)$.

One may now ask if one can perform the corresponding analysis for reflecting pairs in three-dimensions. The answer is yes, and the resulting composition contains the plane rotation version as a special case, since the non-commutative three-dimensional rotation group contains many commutative plane rotation subgroups.

If one denotes by u the common intermediate unit vector in the above described construction for composing reflecting pairs, and call the first vector of the first pair u$_0$, and the second vector of the second pair u$_1$, what is then desirable to produce is an expression for the invariants of the composed pair, Q(u$_0$, u$_1$) in terms of the invariants of the pairs being composed, Q(u$_0$, u) and Q(u; u$_1$). FIG. 3 illustrates such a composition 310.

Applying Lagrange's formula and familiar vector identities, it is not difficult to derive two new vector identities: For any three unit vectors $u_0, u, u_1 \in \mathbb{R}^3$, $u_0 \cdot u_1 = (u_0 \cdot u)(u \cdot u_1) - (u_0 \times u) \cdot (u \times u_1)$, and $u_0 \times u_1 = (u_0 \cdot u)(u \times u_1) + (u \cdot u_1)(u_0 \times u) + (u \times u_1) \times (u_0 \times u)$.

Once calculated or if motivated by other considerations, these formulas may also be confirmed using an adapted basis in which $u = \langle 1, 0, 0 \rangle, u_0 = \langle \cos\theta, -\sin\theta, 0 \rangle$ with $\cos\theta = u_0 \cdot u$, and calculating the remaining components, by differentiating to show the right hand sides are constant as u=u(t) is rotated from u(0)=u$_0$ where the formulas hold identically, or checking them on standard basis vectors and appealing to multilinearity. In terms of the map, Q, if one denotes the scalar and vector parts of Q(u$_0$,u)=[q$_0$, q$_0$], and of Q(u,u$_1$)=[q$_1$, q$_1$], the formula becomes $Q(u_0, u_1) = [q_0 q_1 - q_0 \cdot q_1, q_0 q_1 + q_1 q_0 + q_1 \times q_0]$.

This is quaternion multiplication, which may also be known as the Rodrigues composition formula. It is motivated and derived here from the geometry of rotation using reflecting pairs. If u$_0$, u, and u$_1$ are co-planar, so q$_1 \times$q$_0$=0, this reduces to the complex multiplication formula above, as claimed.

If one keeps the plus and minus classes distinct, equivalence classes of reflecting pairs is isomorphic to the unit quaternions, SU(2), and if one identifies them, the classes obtained are isomorphic to the three-dimensional rotation group, SO(3).

As an example, if one takes $u_0 = \langle 1, 0, 0 \rangle, u = \langle 0, 0, -1 \rangle$, and $u_1 = \rangle 0, 1, 0 \rangle$, $Q(u_0, u) = [q_0, q_0] = [0, \langle 0, 1, 0 \rangle], Q(u, u_1) = [q_1, q_1] = [0, <1, 0, 0>]$, and either directly or using the composition rule, Q(u$_0$, u$_1$)=[0,$\langle 0, 0, 1 \rangle$], which in Hamilton's notation would be written 'ij=k'. Note that when one interprets ij, the half-turn rotation about the y-axis corresponding to j, reflection in u$_0$ then in u, is performed first, in the order of function composition. This is followed by the half-turn rotation about the x-axis corresponding to i, reflection in u then in u$_1$, to obtain the half-turn rotation about the z-axis corresponding to k, reflection in u$_0$ then in u$_1$.

Note the different geometric interpretations of the quaternion i as a half-turn rotation about the x-axis and the complex number i, which one may think of geometrically as a quarter-turn rotation in the x-y plane. Consequently, since $i^2 = -1$ in both cases, the complex number $-1$ corresponds to a half-turn rotation in the x-y plane, while the unit quaternion $-1=[-1, \langle 0,0,0 \rangle]$ corresponds to reflection in two opposite unit vectors, i.e., the identity.

This realization makes it easier to visualize unit quaternions, and hence $S^3$, no less concretely than conventional vectors in $\mathbb{R}^3$. In other words, just as one may think of the vector $v=\langle v_1, v_2, v_3 \rangle \in \mathbb{R}^3$ as any pair of points $((t_1,t_2,t_3), (h_1,h_2,h_3))$ satisfying $h_j-t_j=v_j$, $j=1, 2, 3$, and the rotation in the plane by an angle $\theta$, $z=e^{i\theta}=(\cos \theta, \sin \theta)$ as any pair of unit vectors in $\mathbb{R}^2$, $(u=\langle u_1,u_2 \rangle, v=\rangle v_1,v_2 \rangle)$ satisfying $(u \cdot v, u \times v)=(u_1v_1+u_2v_2,u_1v_2-u_2v_1)=(\cos \theta, \sin \theta)$, one may think of the unit quaternion $Q=[q, q]$ as any pair of unit vectors in $\mathbb{R}^3$, $(u_0; u_1)$ satisfying $[u \cdot v, u \times v]=[q, q]$.

In addition to composition, many other standard quaternion constructions may be understood using this framework. Negation, as has been shown, corresponds to reversing either unit vector of an ordered pair, and gives a previously-known double-covering of the three-dimensional rotation group by the unit quaternions a new simple visual interpretation. Since one can invert two reflections by performing them in the reverse order, one may obtain the inverse of a geometric quaternion by reversing the order of its pair.

Since the scalar product is symmetric with respect to reversing order, but the vector product is anti-symmetric, this corresponds to conjugation of the associated unit quaternion in its standard representation in $S^3 \subset \mathbb{R}^4$. In the composition 310 of reflecting pairs of FIG. 3, (u, u) is one representative of the identity, +1, and (u,−u) is a representative of −1. Since $Q_1=Q(u, u_1)=[q_1, q_1]$, we have $-Q_1=Q(-u, u_1)=[-q_1, -q_1]=-[q_1, q_1]$, which is the opposite quaternion representing the same rotation, and $Q_1^*=Q(u_1,u)=[q_1, -q_1]$ is the inverse or conjugate quaternion, which along with $-Q_1^*$ corresponds to the inverse rotation.

It may be emphasized that in order for this picture to correspond to the correct rotation, and to take advantage of its efficiency, one should interpret any such $(u_0, u_1))$ as a reflecting pair, so if this rotation $R=\rho_{u_1}\rho_{u_0}$ has axis n and angle $\theta$, it can be seen that $$[u \cdot v, u \times v] = [q, q] = \left[\cos\frac{\theta}{2}, \sin\frac{\theta}{2}n\right].$$

In the case of vectors in $\mathbb{R}^n$ or plane rotations, there are distinguished representatives based at the identity, (0, 0, 0), or (1, 0), respectively, while in the case of spatial rotations there is not.

Applying Euler's theorem on the axis of a rotation, it can be shown that every rotation is a transvection defined by some pair of unit vectors. So, by identifying the two classes Q and −Q, this construction may be modified to give a realization of the three-dimensional rotation group SO(3) as equivalence classes of ordered pairs of lines through the origin in $\mathbb{R}^3$.

The construction described herein can also be extended to the full quaternion algebra by eliminating the restriction that $u_0$ and $u_1$ are unit vectors. Since both scalar and vector product are bilinear, the operations of addition or scalar multiplication are realized by finding representatives of two pairs sharing a common first (or second) vectors, and adding (or scalar multiplying) the other vectors.

The same 'shared first vector' construction, described herein, also may be employed in an efficient new algorithm for interpolating rotations (which is also described herein).

A standard method of interpolating rotations $R_0$ and $R_1$ would be to interpolate corresponding quaternions $Q_0$ and $Q_1$ along the shorter arc of the great circle joining them on S3. For this reason the process is sometimes called 'SLERP', for spherical linear interpolation. (For purposes herein, we choose $Q_1$ to be the closer to $Q_0$ of the two opposite quaternions corresponding to $R_1$.) If one sets $\theta=\arccos(Q_0 \cdot Q_1)$ the desired path $Q(\lambda)$, $0 \leq \lambda \leq 1$ joining $Q_0=Q(0)$ and $Q_1=Q(1)$ may then be given by $Q(\lambda)=a_0(\lambda)Q_0+a_1(\lambda)Q_1$, where $$a_0(\lambda) = \frac{\sin((1-\lambda)\theta)}{\sin\theta}, \text{ and } a_1(\lambda) = \frac{\sin(\lambda\theta)}{\sin\theta}.$$

Note that one may replace $\sin(\arccos(Q_0 \cdot Q_1))$ by $\sqrt{1-(Q_0 \cdot Q_1)^2}$.

Just as in the composition and linear combination constructions, one can compute unit vectors u; $u_0$, and $u_1$ such that $Q(u, u_0)=Q_0$ and $Q(u, u_1)=Q_1$. Then if one performs spherical interpolation from $u_0$ to $u_1$ on $S^2 \in \mathbb{R}^3$ by the analogous formula $u(\lambda)=a_0(\lambda)u_0+a_1(\lambda)u_1$, bilinearity would guarantee that the resulting pairs correspond to the standard interpolating path: $Q(u, u(\lambda))=Q(\lambda)$. Applying Lagrange's identity, one may also show that $\theta=\arccos(u_0 \cdot u_1)$, i.e. $u_0 \cdot u_1=Q_0 \cdot Q_1$, and again, one may replace $\sin(\arccos(u_0 \cdot u_1))$ by $\sqrt{1-(u_0 \cdot u_1)^2}$. In FIG. 3, $u(\lambda)$ would be the arc of the great circle joining $u_0$ to $u_1$ (which is not shown).

An advantage of this method over those previously known is not simply that it has been reduced from four to three the number of components used when one interpolates and forms dot products. That is true, however. Another great saving of computational time and resources when applying embodiments of the present inventive methods is that to rotate a vector v by each interpolated quaternion $Q(\lambda)$ in its standard representation in $\mathbb{R}^4$, one must convert $Q(\lambda)$ to a matrix $R=R(Q(\lambda))$ using the Euler-Rodrigues quaternion-to-matrix formula, then multiply Rv, or conjugate quaternion multiply $Q(\lambda)[0, v] Q^*(\lambda)=[0, Rv]$, which requires even more computation.

In contrast, the reflecting pair representation of the interpolating path, as presented in the herein described invention, is ready to act as rotation by composition of two reflections with little or no overhead. One does not even need to compute (and implicitly normalize) a bisector as one did in the trackball application. For any $v \in \mathbb{R}^3$, one may simply form $w=2(v \cdot u)u-v$, and then obtain $Rv=2(w \cdot u(\lambda))u(\lambda)-w$. As in the first section, the advantage over converting to a matrix is greatest when there are few vectors to rotate, i.e., when one only needs to rotate the viewing frame for a scene.

Finally, the reflecting pair realization of SU(2) makes it easy to see and understand the fact that the path in the space of three-dimensional rotations from the identity to itself consisting of two full rotations about an axis can be continuously deformed to the constant path at the identity. This fact is the basis of several well-known topological demonstrations that go by various names such as Dirac's Belt (or String) Trick, Feynman's Philippine Wineglass (or Plate) trick, and the Orientation Entanglement property described in the treatment of spinors (as in a classic general relativity book). It is also the basis of the fact that while the homotopy group of loops of plane rotations is isomorphic (via winding number) to Z, on the other hand, since the loop consisting of two full rotations about an axis is homotopic in SO(3) to a constant loop, the group of homotopy classes of loops of spatial rotations is isomorphic to Z/(2).

A path consisting of two full turns about an axis u may be described by a set of reflecting pairs in which the first unit vector $u_0$ is fixed on the equator of the axis u on the unit sphere in $\mathbb{R}^3$, and the second $u_1(t)$ follows a path circling the same equator once from $u_0$ back to itself. To visualize this better, note that when the vectors $u_1(t)=u_0$, $Q(u_0, u_1(t))=[1, \langle 0,0,0 \rangle]$, and $\rho_{u_1(t)}\rho_{u_0}=I$.

When they are a quarter turn apart, $Q(u_0, u_1(t))=[0, u]$, is a pure vector quaternion, corresponding to a half-turn rotation and represented by a symmetric matrix. When one has gone halfway around the equator, $u_1(t)=-u_0$, $Q(u_0, u_1(t))=[-1, \langle 0,0,0 \rangle]$ and again $\rho_{u_1(t)}\rho_{u_0}=I$, so one has already completed one full rotation about u. As $u_1(t)$ completes its revolution around the equator back to $u_0$, all one has to do to deform this path $\rho_{u_1(t)}\rho_{u_0}$ to the constant path at the identity is to deform the path $u_1(t)$ on $S^3$ to the constant path $u_0$. In other words, the reflecting pairs picture reduces the simple-connectedness of $S^3$ to the simple-connectedness of $S^2$.

Similarly, the fact that one full turn about u is not homotopic to the identity can be understood by letting $u_0$ be as above, but $u_1(t)$ only complete a half-turn about the equator from $u_0$ to $-u_0$. The corresponding path in the rotation group completes one full turn about u from the identity back to itself. That this cannot be deformed to the constant path at the identity is apparent from the fact that the endpoint of $u_1(t)$ cannot be deformed away from $-u_0$ continuously without the corresponding terminal rotation leaving the identity. In other words, the reflecting pairs picture reduces the fact that SO(3) is not simply-connected to the fact that $S^0=\{+1,-1\}$ is not connected. This formulation also enables one to see that the demonstration of the orientation entanglement property is simply the union of two belt trick homotopies, one reflected in the other. (It is interesting to note that if belt tricks are concatenated periodically instead of reflected, the trick can no longer be performed!)

3. Perspective Rendering and Implementation of a Virtual Trackball

Embodiments of the presently disclosed invention may be employed in various forms in computer graphics applications, for example, and among other applications.

Objects and scenes are commonly rendered using elementary transformations that map a data point $i_u$ to a pixel on the screen. These mappings depend on the viewing data, i.e., the viewpoint, $vp \in \mathbb{R}^3$, from which the point is viewed, and the viewframe, an orthonormal basis including the normalized viewing direction, $$vd = -\frac{vp}{\|vp\|}$$

which specifies the orientation of the viewer at the viewpoint. In an application of an embodiment of the present invention, a model of a scene or single object, instead of moving the data points, it is equivalent to performing the inverse motion on the viewing frame.

To render a data point, dtp, one may first map it to its image imp along the line from the viewpoint, vp, to dtp that lies in the image plane orthogonal to the view direction (and passing through the origin). Thus imp=vp+t(dtp−vp), for the value of t satisfying imp·vp=0, which leads to $$t = -\frac{\|vp\|^2}{(dtp-vp) \cdot vp}.$$

Figure 4:
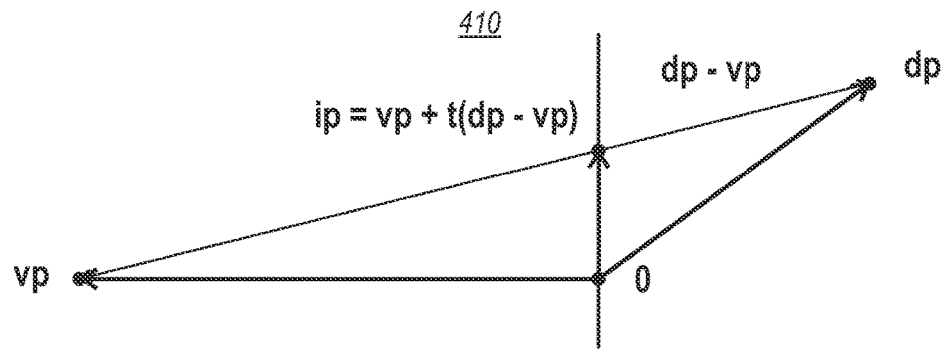
FIG. 4 illustrates the perspective projection of a data point on an image plane.

This is illustrated in the perspective projection 410 depicted in FIG. 4.

It may be noted that the numerator is constant as long as the distance from the viewpoint to the origin is fixed and therefore need not be recomputed. Because this map from $\mathbb{R}^3$ to the image plane does not depend on any particular basis for the image plane, one may use it to initialize the remaining vectors in the viewframe, ir, iu. These vectors form an orthonormal basis for the image plane, corresponding to the horizontal right, and vertical up directions, in both the image plane and on the screen. For example, one may let the initial $i_u$ be the projection of $\langle 0,0,1 \rangle$ into the image plane as determined above, and $i_r = vd \times i_u$.

In embodiments of the present invention, when we implement a 'virtual trackball' with a mouse, we imagine it is located at the head of a unit vector $um \in \mathbb{R}^3$ on the front surface of a transparent unit sphere centered at the origin, in which an object or scene is embedded. (It should be noted that any suitable input device may be utilized in lieu of a mouse.) As the mouse is moved, it incrementally drags this sphere, and the scene about its center at the origin. The pixel at which the mouse is located on screen corresponds to the vector in the image plane im that is collinear with the viewpoint vp and the unit mouse vector urn. The rendering map is not invertible, however we invert the latter two transformations taking a vector in the image plane to pixel coordinates to identify im: $im = c_1 i_r + c_2 i_u$, where $$\langle c_1, c_2 \rangle = \frac{1}{s}\langle px_1 - pc_1, pc_2 - px_2 \rangle.$$

Figure 5:
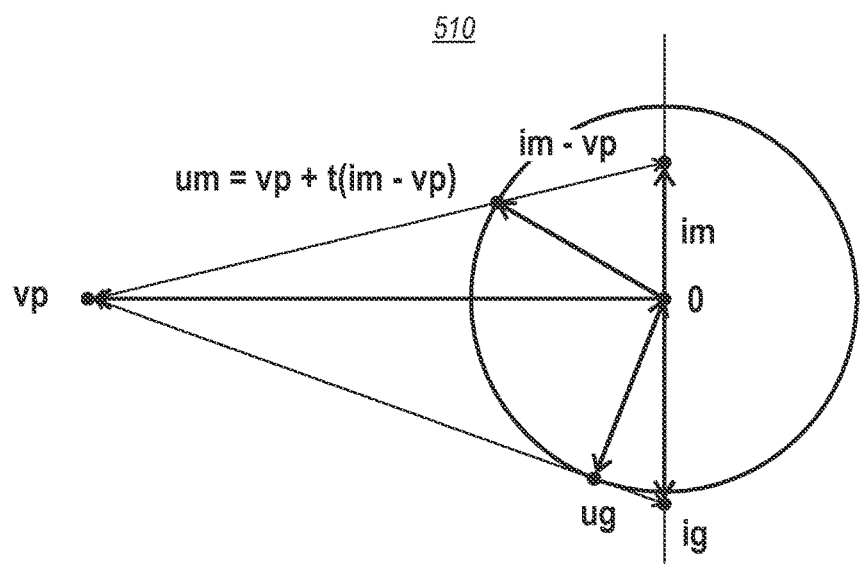
FIG. 5 illustrates the perspective projection of a mouse on a virtual trackball.

Now we can find urn by identifying the point on the line joining vp and urn whose norm is 1. This is illustrated by the perspective projection 510 depicted in FIG. 5.

Accordingly, um=vp+t(im−vp), for the value of t satisfying um·um=1, or $q(t)=at^2+bt+c=0$, where $a=\|im-vp\|^2$, $b=2(vp \cdot (im-vp))$, and $c=\|vp\|^2-1$. Note again that c does not change as long as the distance from vp to the origin is invariant, i.e., that it is only rotated about the origin.

One must consider the possibility of there being no solution or multiple solutions of the quadratic equation above. Geometrically one may see that the cone with vertex at the viewpoint and tangent to the unit sphere, is tangent along a latitude circle about the vd axis. If urn is on this grazing horizon, the line joining the viewpoint and urn intersects the unit sphere exactly once, between the image plane and the viewpoint. This line also intersects the image plane on a circle of radius rg, which may be found using similar triangles and Pythagoras, or by setting the discriminant of q equal to zero. Both approaches give $$rg^2 = \frac{\|vp\|^2}{\|vp\|^2-1} > 1.$$

If $\|im\|^2 > rg^2$, the line joining the viewpoint and im does not intersect the unit sphere, and we set $$um = \frac{im}{\|im\|},$$

the unit vector in the direction of im in the image plane, which one cannot truly 'see' as it is 'behind' the visible horizon of the sphere.

If $\|im\|^2 < rg^2$, q(t)=0 has two solutions, corresponding to the two intersections of the line containing vp and such an im with the unit sphere using the form that avoids the potential instability of the conventional solution formula. As the mouse crosses the grazing circle back and forth, there is a discontinuity in the mapping to the unit sphere that can cause the virtual trackball to jump unnaturally. Since one may initialize and terminate each drag of the ball with a mouse-down and mouse-up event, respectively, this undesirable behavior may be prevented by imitating a fictitious mouse-up and mouse-down event each time we cross the horizon.

(It should be noted that references to "mouse" and "mouse-up" or "mouse-down" events, as occasionally used herein, should be construed broadly to include any known and suitable input device and events which may be interpreted, as is known in the art, to indicate the beginning and/or end of a drag event.)

Once a mouse-down event initializes a first unit vector $u_0 = um_0$, then until the next mouse-up event, in each cycle we may acquire the new mouse pixels and obtain the second unit vector $u_1 = um_1$ which specifies the rotation to be performed (as indicated by the mouse or other data input). After performing the inverse rotation on the viewing frame using the transvection algorithm described herein, one may update the viewpoint using the new view direction and the known view distance from the viewpoint to the origin.

The final step to be performed is to transform the previous second mouse unit vector $u_1$ to become the next initial unit vector. One cannot just let the new $u_0$ be the old $u_1$ since, due to the rotation of the viewing frame, that unit vector no longer corresponds to the point on the screen from which it was obtained. If one did so and left the mouse still, the object would rotate uncontrollably. Fortuitously, one may check that the unit vector that now corresponds to this pixel is simply the old $u_0$. In other words, we only have to compute $u_0$ once per drag, and during each frame of the interactive animation, we only need to compute one square root to obtain the new $u_1$. If this is done, and the mouse is left down but static, the object does not move. (One could also rotate or not depending upon a mouse-moved event.) When a mouse-up event occurs, we have the option of stopping the motion, or if we leave $u_1$ fixed, the latest rotation will be repeated indefinitely, simulating inertial motion of our object.

At least one working example of embodiments and implementations of the present invention, described herein, sufficient for many purposes, has been prepared by the inventors. In it, we define a function that reflects a vector v in the vector u and puts the result in w:

```
function reflect (v,u,w,normfac) {
    c = normfac * dot3 (v, u) ;
    for (i = 0; i < 3; i++)
        w[i] = c*u [i] −v [i] ;
}
```

(where dot3 implements the dot product in R3) and use it to define a function that does two reflections to perform a rotation:

```
function rotate (v,b,normfac,u0) {
    reflect (v, b, w, normfac) ;
    reflect (w, u0, v, 2) ;
}
```

Then, literally, every time we move the mouse and acquire a new unit vector u1, the only lines of code necessary to execute in order to perform the specified rotation on the viewframe and viewpoint are:

```
function transvectviewframe ( ) {
    for (i=0; i < 3; i++) bb [i] = u0 [i] +u1 [i] ;
    normfac = 2.0/dot3 (bb,bb) ;
    rotate (vd,bb,normfac,u0) ;
    rotate (iu,bb,normfac,u0) ;
    cross (vd, iu, ir) ;
    for (i=0; i < 3; i++) vp[i] = −viewdistance*vd[i] ;
}
``` where cross implements the cross product in R3. If there is a simpler, more efficient code to perform this rotation, given u0 and u1, the authors would be interested in learning of it.

Numerous utility algorithms supporting the invention described herein have also been implemented. Notably, conversion from a unit quaternion Q=[q, q] to a reflecting pair $(u_0, u_1)$ may be thought of in purely linear algebraic terms as the problem of finding unit vectors having prescribed scalar q and vector products. A useful result is that if u is any unit vector orthogonal to q, then (u,qu+q×u) and (qu−q×u, u) are reflecting pairs equivalent to Q. One may check by performing the reflecting pair to quaternion map, i.e., taking their scalar and vector products and applying vector identities.

To convert a rotation matrix ρ to a reflecting pair, it may be noted that its axis v is defined by (ρ−1)v=0, so one may take $u_0$ to be any non-zero column of $\rho^T - 1$. Then since $u_1$ should be the bisector of $u_0$ and its image under ρ, $u_1$ 1 is the corresponding column of the anti-symmetric part, A, of ρ:

$$\frac{1}{2}((\rho^T - I) + \rho(\rho^T - I)) = \frac{1}{2}(\rho^T - \rho) = R.$$

(It may also be noted that taking non-generic cases when R=0 into account also leads to a new proof of Euler's theorem.)

From the foregoing detailed description, it may be appreciated that there are multiple embodiments, uses, and applications of the presently disclosed invention.

Embodiments of the present invention includes methods, systems, and computer program products for interpolating rotations from a computing input device. For interpolating rotations from a computing input device, one or more data structures comprising two rotations, $A_1$ and $A_2$ are received. Each rotation is expressed as a composition of two reflections, each reflection having a common initial reflection for each of the rotations, such that $A_1 = R_1 R$ and $A_2 = R_2 R_1$ and each reflection $R_j$ being of the form $R_j = 2u_j u_j^T - I$. Two unit vectors, $u_0$ and $u_1$, are interpolated by $u_s$, $0 < s < 1$, using a standard spherical interpolation on a two-dimensional unit sphere in three-dimensions. Interpolated rotations may then be computed by the formula by $A_s = R_s R$.

Figure 6:
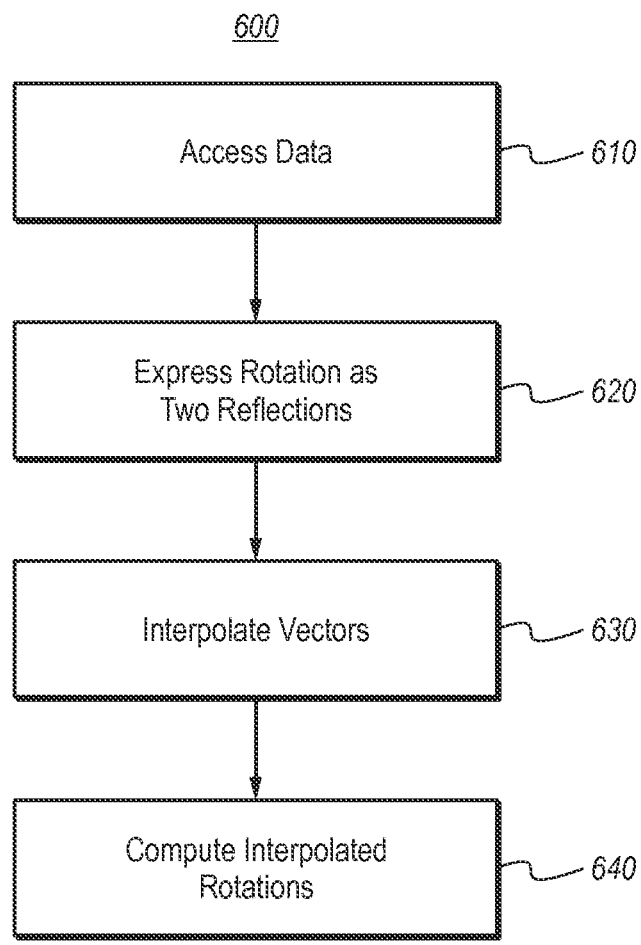
FIG. 6 illustrates a method for interpolating rotations from a computing input device.

For example, FIG. 6 illustrates a method 600 for interpolating rotations from a computing input device. Such a method may include a step 610 in which one or more data structures comprising two rotations, $A_1$ and $A_2$ are accessed or received. Such data structures may be accessed from any suitable media or may be received through any suitable input or communications device or channel. The method may also include a step 620 in which each rotation may be expressed as a composition of two reflections. The two reflections having a common initial reflection for each of the rotations, such that $A_1=R_1R$ and $A_2=R_2R_1$ and each reflection $R_j$ being of the form $R_j=2u_ju_j^T-I$. The method may also include a step 630 in which two unit vectors, $u_0$ and $u_1$, are interpolated using a standard spherical interpolation on a two-dimensional unit sphere in three-dimensions. The method may also include a step 640 for computing interpolated rotations using the formula $A_s=R_sR$.

Advantages over currently known methods using unit quaternions on the three-dimensional unit sphere in four-dimensions may be noted. First, the spherical interpolation formula is applied in one less dimension, involving one less coordinate. Second, the interpolated rotations can be applied directly and more efficiently in the form of two reflections in unit vectors requiring six multiplications each, instead of being converted to matrices then matrix multiplied (which requires more complexity and computation). When the few vectors describing a viewer's perspective need to be rotated, this may be faster due to the savings in overhead from there being no need to convert before applying the interpolated rotations. Despite being more efficient, the result is identically equivalent.

Embodiments of the present invention also includes methods, systems, and computer program products for constructing a rotation matrix for rotating a unit vector $u_0$ to another unit vector $u_1$ and preserving a plane and axis defined by the unit vectors for rotating a computer animated object. For constructing a rotation matrix for rotating a unit vector $u_0$ to another unit vector $u_1$ and preserving a plane and axis defined by the unit vectors for rotating a computer animated object, a sum, s, of the unit vectors, $s=u_0+u_1$ is computed. It may then be determined whether the sum, s, is equal to zero. A rotation matrix based upon the unit vectors and the sum, s, may then be determined. The rotation matrix, A, may be computed as a result of the formula $A=I-2ss^t/(s^ts)+2u_1u_o^t$.

Figure 7:
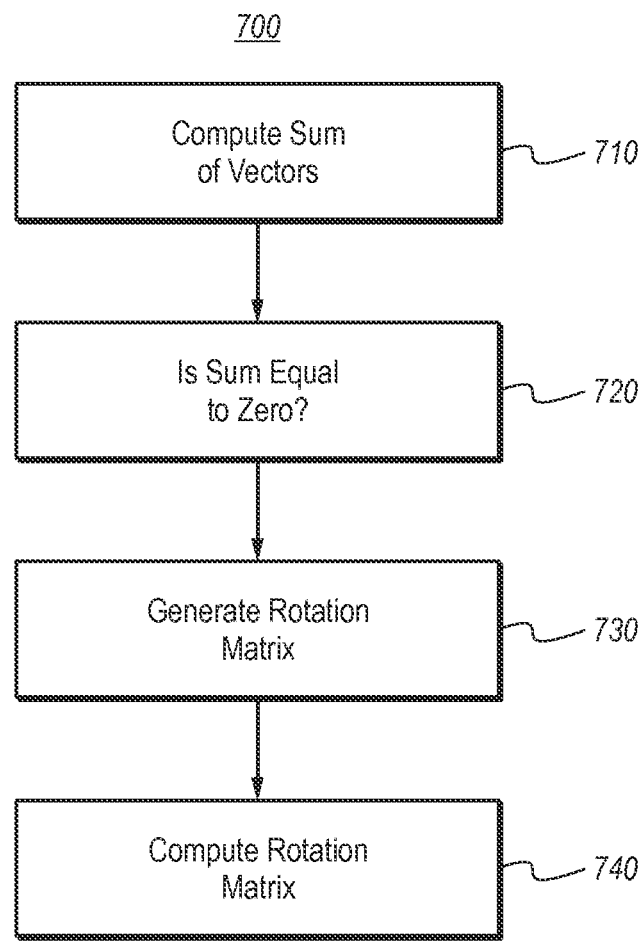
FIG. 7 illustrates a method for constructing a rotation matrix for rotating a unit vector.

For example, FIG. 7 illustrates a method 700 for constructing a rotation matrix for rotating a unit vector. The method may include a step 710 for computing a sum, s, of the unit vectors, $s=u_0+u_1$. The method may also include determining 720 whether the sum, s, is equal to zero. The method may also include generating 730 a rotation matrix based upon the unit vectors and the sum, s. The method may also include computing 740 a rotation matrix, A, as a result of the formula $$A=I-2ss^t/(s^ts)+2u_1u_o^t.$$

It may be appreciated that this method may be simpler and preserves the axis more effectively than prior known methods (e.g., those published by Moller and Hughes in 1999 and corrected in 2003). Further the new method is equally efficient in its one simple formulation as the best case of the previous method, and considerably more efficient than the exceptional cases. To accomplish this, one may use the fact that $s^ts$ is the sum of the diagonal elements of $u_1u_0^T$. When $u_0=u_1$ the presently disclosed method needs no special treatment and reduces to the identity matrix as it should.

Embodiments of the present invention also includes methods, systems, and computer program products for rotating vectors defining a perspective of a viewer of a computer graphics output device to implement rotation of a computer generated image by taking a unit vector $u_0$ to another unit vector $u_1$ and preserving the plane and axis defined by the unit vectors. For rotating vectors defining a perspective of a viewer of a computer graphics output device to implement rotation of a computer generated image by taking a unit vector $u_0$ to another unit vector $u_1$ and preserving the plane and axis defined by the unit vectors, data indicative of unit vectors $u_0$ and $u_1$ from a computer input device may be received. A rotation as seen from the viewpoint may be computed by performing an inverse rotation $A^{-1}$ on an orthogonal frame describing an orientation of a viewpoint. Performing the inverse rotation $A^{-1}$ on an orthogonal frame comprises constructing a sum s of the unit vectors, $s=u_0+u_1$; computing a normalization factor $k=2/s^Ts$; performing an inverse rotation for two of three vectors of a viewpoint frame, $e_0$ and $e_1$, by reflecting in s, then reflecting in $u_0$; and determining a third viewpoint orientation vector $e_2$ by computing a cross product of the two vectors that have been rotated.

Performing an inverse rotation for two of three vectors of a viewpoint frame, $e_0$ and $e_1$, by reflecting in s, then reflecting in computing $u_0$, by applying the following equations: $w=kss^Te_j-e_j$, and $A^{-1}e_j=2u_0u_o^Tw_j-w_j$. In determining a third viewpoint orientation vector $e_2$ by computing a cross product of the two vectors that have been rotated, it is done such that $e_2=e_0 \times e_1$.

Figure 8:
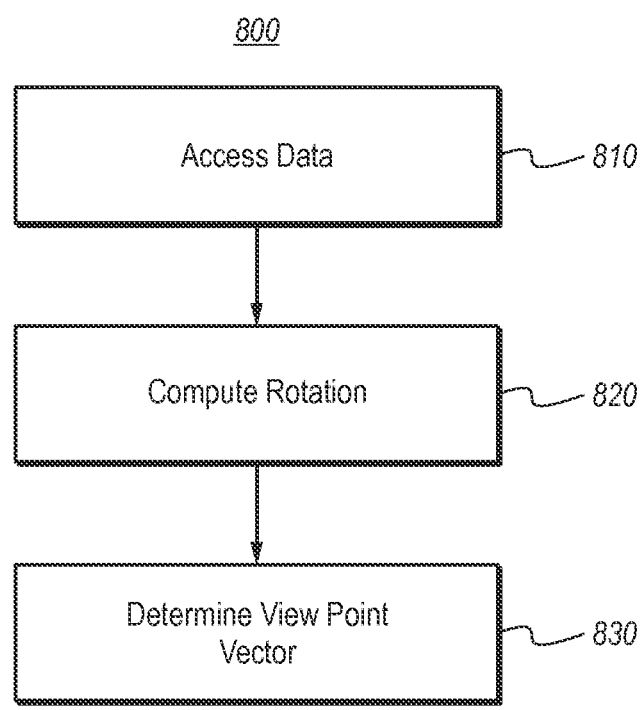
FIG. 8 illustrates a method for rotating vectors defining a viewpoint of a view of a computer output device.

For example, FIG. 8 illustrates a method 800 for rotating vectors defining a viewpoint of a view of a computer output device. Such a method may be for rotating vectors defining a perspective of a viewer of a computer graphics output device to implement rotation of a computer generated image by taking a unit vector $u_0$ to another unit vector $u_1$ and preserving the plane and axis defined by the unit vectors. The method may include accessing 810 or receiving data from a computer input device data indicative of unit vectors $u_0$ and $u_1$. The data may be accessed 810 from any suitable medium or may be received from a computer input device. The method may also include computing 820 a rotation as seen from the viewpoint by performing an inverse rotation $A^{-1}$ on an orthogonal frame describing an orientation of a viewpoint. The method may also include determining 830 a third viewpoint orientation vector $e_2$ by computing a cross product of two vectors that have been rotated such that $e_2=e_0 \times e_1$.

Embodiments of the present invention also includes methods, systems, and computer program products for calculating a spherical interpolation of two unit quaternions. Previously known methods for spherical interpolation of two unit quaternions have sometimes been termed "SLERP." The presently disclosed methods may provide an accelerated way of determining such interpolations and provide certain advantages over the methods previously known.

For calculating a spherical interpolation of two unit quaternions, data is accessed comprising two unit quarternions, $Q_0$ and $Q_1$. It may be determined that $L((s+t)/2)=0.5(Q(s)+Q(t))$ does not result in a unit quaternion. $Q((s+t)/2)=L((s+t)/2)/\|L((s+t)/2)\|$ is normalized to obtain unit quaternions with to equally spaced $Q_t$ values. The normalization of $Q((s+t)/2)=L((s+t)/2)/\|L((s+t)/2)\|$ with $s=0$ and $t=1$ produces $Q(\frac{1}{2})$. The normalization of $Q((s+t)/2)=L((s+t)/2)/\|L((s+t)/2)\|$ with $s=0$ and $t=\frac{1}{2}$ produces $Q(\frac{1}{4})$, and the normalization of $Q((s+t)/2)=L((s+t)/2)/\|L((s+t)/2)\|$ with $s=\frac{1}{2}$ and $t=1$ produces $Q(\frac{3}{4})$. Or, one can continue in this fashion to define $Q(r)$ recursively for all dyadic rational r with $0 < r < 1$.

Figure 9:
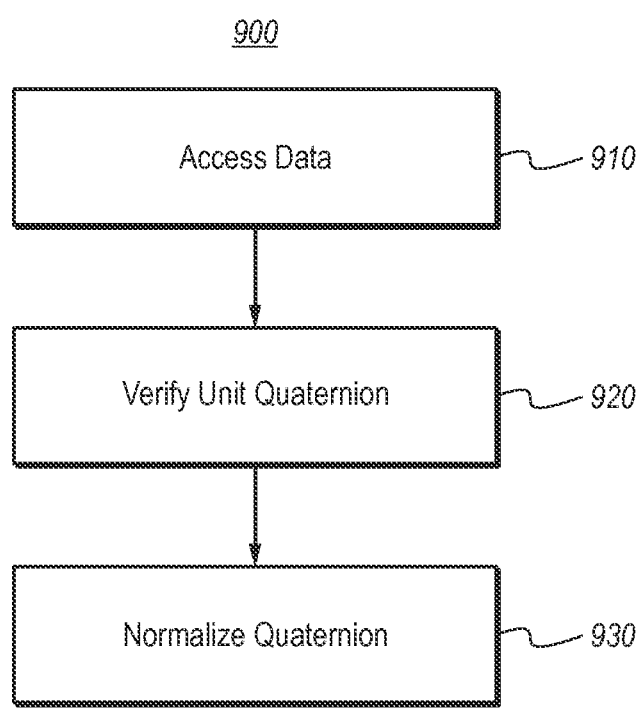
FIG. 9 illustrates a method for calculating an interpolation of two unit quaternions.

For example, FIG. 9 illustrates a method 900 for calculating a spherical interpolation of two unit quaternions. The method may include accessing 910 data comprising two unit quarternions, $Q_0$ and $Q_1$. The method may also include determining 920 that $L((s+t)/2)=0.5(Q(s)+Q(t))$ does not result in a unit quaternion. The method may also include normalizing 930

$$Q((s+t)/2)=L((s+t)/2)/\|L((s+t)/2)\|$$

to obtain unit quaternions with to equally spaced $Q_t$ values.

Another embodiment may include normalizing $Q((s+t)/2)=L((s+t)/2)/\|L((s+t)/2)\|$ with $s=0$ and $t=\frac{1}{4}$ to produce $Q(\frac{1}{8})$.

Another embodiment may include normalizing $Q((s+t)/2)=L((s+t)/2)/\|L((s+t)/2)\|$ with $s=\frac{1}{4}$ and $t=\frac{1}{2}$ to produce $Q(\frac{3}{8})$.

Another embodiment may include normalizing $Q((s+t)/2)=L((s+t)/2)/\|L((s+t)/2)\|$ with $s=\frac{1}{2}$ and $t=\frac{3}{4}$ to produce $Q(\frac{5}{8})$.

Another embodiment may include normalizing $Q((s+t)/2)=L((s+t)/2)/\|L((s+t)/2)\|$ with $s=\frac{3}{4}$ and $t=1$ to produce $Q(\frac{7}{8})$.

It may also be appreciated that a general formula may be implemented for the $2^{N-1}$ new midpoints at each stage. An example of such pseudocode may be:

```
for N = 1, 2, . . .
    for j=1, . . . , 2^{N-1}
        let
            s = (2j-2) / 2^N
            t = 2j / 2^N
        so then (s+t) / 2 = (2j-1) / 2^N
```

Since $Q(s)$ and $Q(t)$ have been computed at the previous stage (N−1) or are given in $Q(0)$ and $Q(1)$ at the initial stage (N=1),
compute $L((s+t)/2)=(\frac{1}{2})(Q(s)+Q(t))$, and
compute $Q((s+t)/2)=L((s+t)/2)/\|L((s+t)/2)\|$.

Embodiments of the present invention also includes methods, systems, and computer program products for mapping a point in an $e_1$-$e_2$ plane orthogonal to a vector $e_3$ to a point in the plane orthogonal to an arbitrary given unit vector u. For mapping a point in an $e_1$-$e_2$ plane orthogonal to a vector $e_3$ to a point in the plane orthogonal to an arbitrary given unit vector u, a data structure comprising a vector $v=c_1 e_1+c_2 e_2$ is accessed. The vector v is rotated by applying a rotation taking $e_3$ to u. Applying the rotation taking $e_3$ to u to the vector v comprises applying a reflection in $e_3$ to the vector v, resulting in a vector w; and applying a reflection in a sum, $e_3+u$, to the vector w.

Figure 10:
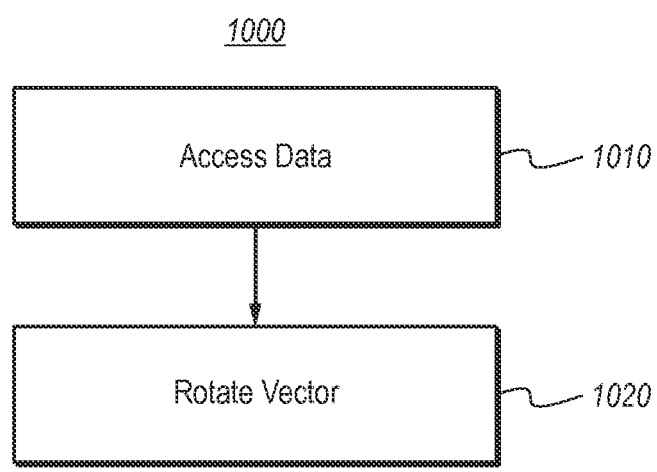
FIG. 10 illustrates a method for mapping a point in a plane to a point in the plane orthogonal to an input vector.

For example, FIG. 10 illustrates a method 1000 for mapping a point in an $e_1$-$e_2$ plane orthogonal to a vector $e_3$ to a point in the plane orthogonal to an arbitrary given unit vector u. The method may include accessing 1010 or receiving a data structure comprising a vector $v=c_1 e_1+c_2 e_2$. The data may be accessed from any suitable medium or may be received from any suitable input device or communications device or channel. The method 1000 may also include rotating 1020 the vector v by applying a rotation taking $e_3$ to u. Applying the rotation taking $e_3$ to u to the vector v comprises applying a reflection in $e_3$ to the vector v, resulting in a vector w; and applying a reflection in a sum, $e_3+u$, to the vector w The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for implementing a method for calculating rotations of a graphical object for display upon a computer system display using input from a computing input device, the computer program product comprising one or more computer hardware storage devices having computer executable instructions encoded thereon which, when executed upon one or more computer processors, perform the method comprising:

accessing a stored graphical data structure comprising data defining a graphical object which is to be displayed on a computer system display device;

receiving input from a computing input device, the input comprising data associated with an intended rotation of the graphical object;

receiving one or more data structures comprising two rotations, $A_1$ and $A_2$, the two rotations associated with the intended rotation of the graphical object;

expressing each rotation as a composition of two reflections, each reflection having a common initial reflection for each of the rotations, such that $A_1=R_1 R$ and $A_2=R_2 R_1$ and each reflection $R_j$ being of the form $R_j=2u_j u_j^T-I$;

interpolating two unit vectors, $u_0$ and $u_1$, by $u_s$, $0 \le s \le 1$, using a standard spherical interpolation on a two-dimensional unit sphere in three-dimensions;

computing interpolated rotations using the formula $A_s=R_s R$;

applying the computed interpolated rotations to the stored graphical data structure to realize the intended rotation; and storing an updated graphical data structure defining the graphical object with the rotations applied which is to be rendered upon the computer system display device.

2. A computer program product for implementing a method for rotating a computer animated object by constructing a rotation matrix for rotating a unit vector $u_0$ to another unit vector $u_1$ and preserving a plane and axis defined by the unit vectors, the computer program product comprising one or more computer hardware storage devices having computer executable instructions encoded thereon which, when executed upon one or more computer processors, perform the method comprising:

accessing a stored graphical data structure representing a computer animated object which is to be displayed on a computer system display device;

computing a sum, s, of the unit vectors, $s=u_0+u_1$;

determining whether the sum, s, is equal to zero;

generating a rotation matrix based upon the unit vectors and the sum, s; and computing a rotation matrix, A, as a result of the formula:

$$A=I-2ss^t/(s^t s)+2u_1 u_o^t;$$

applying the computed rotation matrix to the stored graphical data structure to effect a rotation of the computer animated object; and storing an updated graphical data structure defining the computer animated object with the rotation applied which is to be rendered upon the computer system display device.

3. A computer program product for implementing a method for rotating vectors defining a viewpoint of a viewer of a computer graphics output device to implement rotation of a computer generated image by taking a unit vector $u_0$ to another unit vector $u_1$ and preserving the plane and axis defined by the unit vectors, the computer program product comprising one or more computer hardware storage devices having computer executable instructions encoded thereon which, when executed upon one or more computer processors, perform the method comprising:
  accessing a stored graphical data structure representing a computer generated image which is to be displayed on a computer system display device;
  receiving data indicative of unit vectors $u_0$ and $u_1$ from a computer input device;
  computing a rotation as seen from the viewpoint by performing an inverse rotation $A^{-1}$ on an orthogonal frame describing an orientation of a viewpoint, wherein performing the inverse rotation $A^{-1}$ on an orthogonal frame comprises:
    constructing a sum s of the unit vectors, $s = u_0 + u_1$;
    computing a normalization factor $k = 2/s^T s$;
    performing an inverse rotation for two of three vectors of a viewpoint frame, $e_0$ and $e_1$, by reflecting in s, then reflecting in computing $u_0$, by applying the following equations:

$$w = k s s^T e_j - e_j, \text{ and}$$

$$A^{-1} e_j = 2 u_0 u_0^T w_j - w_j; \text{ and}$$

determining a third viewpoint orientation vector $e_2$ by computing a cross product of the two vectors that have been rotated such that $e_2 = e_0 \times e_1$; and
  applying the computed rotation to the stored graphical data structure to effect a rotation of the computer generated image; and
  storing an updated graphical data structure defining the computer generated image with the rotation applied which is to be rendered upon the computer system display device.

4. A computer program product for implementing a method for rotating a graphical object by calculating a spherical interpolation of two unit quaternions, the computer program product comprising one or more computer hardware storage devices having computer executable instructions encoded thereon which, when executed upon one or more computer processors, perform the method comprising:
  accessing a stored graphical data structure representing a graphical object which is to be displayed on a computer system display device;
  accessing a data structure comprising two unit quaternions, $Q_0$ and $Q_1$;
  determining that $L((s+t)/2) = 0.5 \ (Q(s) + Q(t))$ does not result in a unit quaternion;
  normalizing $Q((s+t)/2) = L((s+t)/2)/\|L((s+t)/2)\|$ to obtain unit quaternions with to equally spaced $Q_t$ values, wherein
    the normalization of $Q((s+t)/2) = L((s+t)/2)/\|L((s+t)/2)\|$ with $s=0$ and $t=1$ produces $Q(½)$;
    the normalization of $Q((s+t)/2) = L((s+t)/2)/\|L((s+t)/2)\|$ with $s=0$ and $t=½$ produces $Q(¼)$; and
    the normalization of $Q((s+t)/2) = L((s+t)/2)/\|L((s+t)/2)\|$ with $s=½$ and $t=1$ produces $Q(¾)$;
  applying the unit quaternions obtained by normalizing to the stored graphical data structure to realize a rotation of the graphical object; and
  storing an updated graphical data structure defining the graphical object with the rotation applied which is to be rendered upon the computer system display device.

5. The computer program product of claim 4, the method further comprising:
  normalizing $Q((s+t)/2) = L((s+t)/2)/\|L((s+t)/2)\|$ with $s=0$ and $t=¼$ to produce $Q(⅛)$.

6. The computer program product of claim 4, the method further comprising:
  normalizing $Q((s+t)/2) = L((s+t)/2)/\|L((s+t)/2)\|$ with $s=¼$ and $t=½$ to produce $Q(⅜)$.

7. The computer program product of claim 4, the method further comprising:
  normalizing $Q((s+t)/2) = L((s+t)/2)/\|L((s+t)/2)\|$ with $s=½$ and $t=¾$ to produce $Q(⅝)$.

8. The computer program product of claim 4, the method further comprising:
  normalizing $Q((s+t)/2) = L((s+t)/2)/\|L((s+t)/2)\|$ with $s=¾$ and $t=1$ to produce $Q(⅞)$.

9. A computer program product for implementing a method for mapping a point in an $e_1$-$e_2$ plane orthogonal to a vector $e_3$ to a point in the plane orthogonal to an arbitrary given unit vector u, the computer program product comprising one or more computer hardware storage devices having computer executable instructions encoded thereon which, when executed upon one or more computer processors, perform the method comprising:
  accessing a graphical data structure comprising a point p1 in a plane P, the graphical data structure further representing a graphical object which is to be displayed on a computer system display device;
  mapping the point p1 to a point p2 in the plane, such that p2 is orthogonal to a given unit vector u by, including:
    accessing a data structure comprising a vector $v = c_1 e_1 + c_2 e_2$;
    rotating the vector v by applying a rotation taking $e_3$ to u, wherein applying the rotation taking $e_3$ to u to the vector v comprises:
      applying a reflection in $e_3$ to the vector v, resulting in a vector w; and
      applying a reflection in a sum, $e_3 + u$, to the vector w; and
  storing an updated graphical data structure defining the graphical object with the rotations applied which is to be rendered upon the computer system display device.

10. A system for implementing a method for interpolating rotations from a computing input device, the system comprising one or more computer processors and one or more computer storage devices having computer executable instructions encoded thereon which, when executed upon the one or more computer processors, perform the method comprising:
  accessing a stored graphical data structure comprising data defining a graphical object which is to be displayed on a computer system display device;
  receiving input from a computing input device, the input comprising data associated with an intended rotation of the graphical object;
  receiving one or more data structures comprising two rotations, $A_1$ and $A_2$, the two rotations associated with the intended rotation of the graphical object;
  expressing each rotation as a composition of two reflections, each reflection having a common initial reflection for each of the rotations, such that $A_1 = R_1 R$ and $A_2 = R_2 R_1$ and each reflection $R_j$ being of the form $R_j = 2 u_j u_j^T - I$;
  interpolating two unit vectors, $u_0$ and $u_1$, by $u_s$, $0 < s < 1$, using a standard spherical interpolation on a two-dimensional unit sphere in three-dimensions;
  computing interpolated rotations using the formula $A_s = R_s R$;
  applying the computed interpolated rotations to the stored graphical data structure to realize the intended rotation; and storing an updated graphical data structure defining the graphical object with the rotations applied which is to be rendered upon the computer system display device.

11. A system for implementing a method for constructing a rotation matrix for rotating a computer animated object by rotating a unit vector $u_0$ to another unit vector $u_1$ and preserving a plane and axis defined by the unit vectors, the system comprising one or more computer processors and one or more computer storage devices having computer executable instructions encoded thereon which, when executed upon the one or more computer processors, perform the method comprising:

accessing a stored graphical data structure representing a computer animated object which is to be displayed on a computer system display device;
computing a sum, s, of the unit vectors, $s=u_0+u_1$;
determining whether the sum, s, is equal to zero;
generating a rotation matrix based upon the unit vectors and the sum, s; and
computing a rotation matrix, A, as a result of the formula:

$$A=I-2ss^t/(s^ts)+2u_1u_o^t;\ \text{and}$$

applying the computed rotation matrix to the stored graphical data structure to effect a rotation of the computer animated object; and
storing an updated graphical data structure defining the computer animated object with the rotation applied which is to be rendered upon the computer system display device.

12. A system for implementing a method for rotating vectors defining a viewpoint of a viewer of a computer graphics output device to implement rotation of a computer generated image by taking a unit vector $u_0$ to another unit vector $u_1$ and preserving the plane and axis defined by the unit vectors, the system comprising one or more computer processors and one or more computer storage devices having computer executable instructions encoded thereon which, when executed upon the one or more computer processors, perform the method comprising:

accessing a stored graphical data structure representing a computer generated image which is to be displayed on a computer system display device;
receiving data indicative of unit vectors $u_0$ and $u_1$ from a computer generated input device;
computing a rotation as seen from the viewpoint by performing an inverse rotation $A^{-1}$ on an orthogonal frame describing an orientation of a viewpoint, wherein performing the inverse rotation $A^{-1}$ on an orthogonal frame comprises:
constructing a sum s of the unit vectors, $s=u_0+u_1$;
computing a normalization factor $k=2/s^Ts$;
performing an inverse rotation for two of three vectors of a viewpoint frame, $e_0$ and $e_1$, by reflecting in s, then reflecting in computing $u_0$, by applying the following equations:

$$w=kss^Te_j-e_j,\ \text{and}$$

$$A^{-1}e_j=2u_0u_0^Tw_j-w_j;\ \text{and}$$

determining a third viewpoint orientation vector $e_2$ by computing a cross product of the two vectors that have been rotated such that $e_2=e_0\times e_1$; and
applying the computed rotation to the stored graphical data structure to effect a rotation of the computer generated image; and storing an updated graphical data structure defining the computer generated image with the rotation applied which is to be rendered upon the computer system display device.

13. A system for implementing a method for rotating a graphical object by calculating a spherical interpolation of two unit quaternions, the system comprising one or more computer processors and one or more computer storage devices having computer executable instructions encoded thereon which, when executed upon the one or more computer processors, perform the method comprising:

accessing a stored graphical data structure representing a graphical object which is to be displayed on a computer system display device;
accessing a data structure comprising two unit quarternions, $Q_0$ and $Q_1$;
determining that $L((s+t)/2)=0.5\ (Q(s)+Q(t))$ does not result in a unit quaternion;
normalizing $Q((s+t)/2)=L((s+t)/2)/\|L((s+t)/2)\|$ to obtain unit quaternions with to equally spaced $Q_t$ values, wherein
the normalization of $Q((s+t)/2)=L((s+t)/2)/\|L((s+t)/2)\|$ with s=0 and t=1 produces $Q(½)$;
the normalization of $Q((s+t)/2)=L((s+t)/2)/\|L((s+t)/2)\|$ with s=0 and t=½ produces $Q(¼)$; and
the normalization of $Q((s+t)/2)=L((s+t)/2)/\|L((s+t)/2)\|$ with s=½ and t=1 produces $Q(¾)$; and
applying the unit quaternions obtained by normalizing to the stored graphical data structure to realize a rotation of the graphical object; and
storing an updated graphical data structure defining the graphical object with the rotation applied which is to be rendered upon the computer system display device.

14. The system of claim 13, the method further comprising:
normalizing $Q((s+t)/2)=L((s+t)/2)/\|L((s+t)/2)\|$ with s=0 and t=¼ to produce $Q(⅛)$.

15. The system of claim 13, the method further comprising:
normalizing $Q((s+t)/2)=L((s+t)/2)/\|L((s+t)/2)\|$ with s=¼ and t=½ to produce $Q(⅜)$.

16. The system of claim 13, the method further comprising:
normalizing $Q((s+t)/2)=L((s+t)/2)/\|L((s+t)/2)\|$ with s=½ and t=¾ to produce $Q(⅝)$.

17. The system of claim 13, the method further comprising:
normalizing $Q((s+t)/2)=L((s+t)/2)/\|L((s+t)/2)\|$ with s=¾ and t=1 to produce $Q(⅞)$.

18. A system for implementing a method for mapping a point in an $e_1$–$e_2$ plane orthogonal to a vector $e_3$ to a point in the plane orthogonal to an arbitrary given unit vector u, the system comprising one or more computer processors and one or more computer storage devices having computer executable instructions encoded thereon which, when executed upon the one or more computer processors, perform the method comprising:

accessing a graphical data structure comprising a point p1 in a plane P, the graphical data structure further representing a graphical object which is to be displayed on a computer system display device;
mapping the point p1 to a point p2 in the plane, such that p2 is orthogonal to a given unit vector u by, including:
accessing a data structure comprising a vector $v=c_1e_1+c_2e_2$;

rotating the vector v by applying a rotation taking $e_3$ to u, wherein applying the rotation taking $e_3$ to u to the vector v comprises:
   applying a reflection in $e_3$ to the vector v, resulting in a vector w; and
   applying a reflection in a sum, $e_3+u$, to the vector w; and
storing an updated graphical data structure defining the graphical object with the rotations applied which is to be rendered upon the computer system display device.

* * * * *